US010719705B2

(12) United States Patent
Taveira et al.

(10) Patent No.: US 10,719,705 B2
(45) Date of Patent: Jul. 21, 2020

(54) ADJUSTABLE OBJECT AVOIDANCE PROXIMITY THRESHOLD BASED ON PREDICTABILITY OF THE ENVIRONMENT

(71) Applicant: QUALCOMM Incorporated, San Diego, CA (US)

(72) Inventors: Michael Franco Taveira, Rancho Santa Fe, CA (US); Daniel Warren Mellinger, III, Philadelphia, PA (US)

(73) Assignee: Qualcomm Incorporated, San Diego, CA (US)

( * ) Notice: Subject to any disclaimer, the term of this patent is extended or adjusted under 35 U.S.C. 154(b) by 156 days.

(21) Appl. No.: 15/860,928

(22) Filed: Jan. 3, 2018

(65) Prior Publication Data

US 2019/0205609 A1 Jul. 4, 2019

(51) Int. Cl.
*G06K 9/00* (2006.01)
*G06K 9/46* (2006.01)
(Continued)

(52) U.S. Cl.
CPC ......... *G06K 9/0063* (2013.01); *G05D 1/0055* (2013.01); *G05D 1/0202* (2013.01);
(Continued)

(58) Field of Classification Search
CPC ............. G06K 9/0063; G06K 9/00697; G06K 9/4652; G05D 1/0055; G05D 1/0202;
(Continued)

(56) References Cited

U.S. PATENT DOCUMENTS 4,809,178 A 2/1989 Ninomiya et al.
5,979,824 A 11/1999 Gagliano et al.
(Continued)

FOREIGN PATENT DOCUMENTS

CN 204776022 U 11/2015
CN 106347656 A 1/2017
(Continued)

OTHER PUBLICATIONS

"PhantomPilots", Retrieved from internet on Sep. 27, 2017, https://phantompilots.com/threads/propeller-guards-mounted-obstacle-avoidance-turned-of, pp. 1-9.
(Continued)

*Primary Examiner* — Aaron L Troost
(74) *Attorney, Agent, or Firm* — The Marbury Law Group

(57) ABSTRACT

Various embodiments include methods, devices, and robotic vehicle processing devices implementing such methods for automatically adjusting the minimum distance that a robotic vehicle is permitted to approach an object by a collision avoidance system (the "proximity threshold") to compensate for unpredictability in environmental or other conditions that may compromise control or navigation of the robotic vehicle, and/or to accommodate movement unpredictability of the object. Some embodiments enable dynamic adjustments to the proximity threshold to compensate for changes in environmental and other conditions. Some embodiments include path planning that takes into account unpredictability in environmental or other conditions plus movement unpredictability of objects in the environment.

29 Claims, 9 Drawing Sheets

(51) Int. Cl.
*G08G 5/00* (2006.01)
*G05D 1/02* (2020.01)
*G08G 5/04* (2006.01)
*G05D 1/00* (2006.01)

(52) U.S. Cl.
CPC ....... *G06K 9/00697* (2013.01); *G06K 9/4652* (2013.01); *G08G 5/006* (2013.01); *G08G 5/0013* (2013.01); *G08G 5/0021* (2013.01); *G08G 5/0069* (2013.01); *G08G 5/0086* (2013.01); *G08G 5/045* (2013.01); *B64C 2201/141* (2013.01); *G05D 1/0088* (2013.01); *G05D 1/0094* (2013.01); *G06T 2207/10028* (2013.01)

(58) Field of Classification Search
CPC .. G05D 1/0088; G05D 1/0094; G08G 5/0013; G08G 5/0021; G08G 5/006; G08G 5/0069; G08G 5/0086; G08G 5/045; B64C 2201/141; G06T 2207/10028
See application file for complete search history.

(56) References Cited

U.S. PATENT DOCUMENTS

| | | | |
|---|---|---|---|
| 6,253,128 B1 | 6/2001 | Kageyama et al. | |
| 6,270,038 B1 | 8/2001 | Cycon et al. | |
| 7,335,071 B1 | 2/2008 | Motsenbocker | |
| 8,239,125 B2 | 8/2012 | Petrie et al. | |
| 8,355,861 B2 | 1/2013 | Petrini | |
| 8,543,265 B2 | 9/2013 | Ekhaguere et al. | |
| 8,761,967 B2 | 6/2014 | Fisher et al. | |
| 9,043,052 B2 | 5/2015 | So et al. | |
| 9,261,879 B2 | 2/2016 | Ferguson et al. | |
| 9,421,869 B1* | 8/2016 | Ananthanarayanan | B60L 5/005 |
| 9,609,288 B1 | 3/2017 | Richman et al. | |
| 9,613,539 B1* | 4/2017 | Lindskog | G08G 5/04 |
| 9,632,507 B1 | 4/2017 | Korn | |
| 9,927,807 B1 | 3/2018 | Ganjoo | |
| 2003/0051544 A1 | 3/2003 | Hong | |
| 2006/0192047 A1 | 8/2006 | Goossen | |
| 2007/0034734 A1 | 2/2007 | Yoeli | |
| 2007/0080793 A1 | 4/2007 | Blase | |
| 2009/0283629 A1 | 11/2009 | Kroetsch et al. | |
| 2012/0025962 A1 | 2/2012 | Toll | |
| 2012/0025964 A1 | 2/2012 | Beggs et al. | |
| 2014/0136044 A1* | 5/2014 | Conrad | B60W 30/09 701/23 |
| 2015/0269847 A1 | 9/2015 | Knight | |
| 2015/0321759 A1 | 11/2015 | Caubel et al. | |
| 2016/0016664 A1 | 1/2016 | Basuni | |
| 2016/0023759 A1 | 1/2016 | Barrett et al. | |
| 2016/0039529 A1 | 2/2016 | Buchmueller et al. | |
| 2016/0075332 A1 | 3/2016 | Edo-Ros | |
| 2016/0185345 A1 | 6/2016 | Sasabuchi et al. | |
| 2016/0200437 A1 | 7/2016 | Ryan et al. | |
| 2016/0247115 A1 | 8/2016 | Pons | |
| 2017/0029101 A1 | 2/2017 | Weissenberg et al. | |
| 2017/0043869 A1 | 2/2017 | Howard et al. | |
| 2017/0069214 A1 | 3/2017 | Dupray et al. | |
| 2017/0076616 A1 | 3/2017 | Kanade et al. | |
| 2017/0090480 A1 | 3/2017 | Ho et al. | |
| 2017/0132334 A1* | 5/2017 | Levinson | G06F 17/5009 |
| 2017/0144753 A1 | 5/2017 | Yu et al. | |
| 2017/0158320 A1 | 6/2017 | Bosch | |
| 2017/0177937 A1 | 6/2017 | Harmsen et al. | |
| 2017/0235018 A1 | 8/2017 | Foster et al. | |
| 2017/0242442 A1* | 8/2017 | Minster | G05D 1/0248 |
| 2017/0255206 A1 | 9/2017 | Chen et al. | |
| 2017/0267234 A1 | 9/2017 | Kemp et al. | |
| 2017/0267347 A1 | 9/2017 | Rinaldi et al. | |
| 2017/0301249 A1 | 10/2017 | Kunzi et al. | |
| 2017/0313421 A1 | 11/2017 | Gil et al. | |
| 2017/0323256 A1 | 11/2017 | Cheatham, III et al. | |
| 2017/0339487 A1 | 11/2017 | Alvord et al. | |
| 2018/0155018 A1 | 6/2018 | Kovac et al. | |
| 2018/0246529 A1 | 8/2018 | Hu et al. | |
| 2018/0275654 A1 | 9/2018 | Merz et al. | |
| 2018/0290748 A1 | 10/2018 | Corban et al. | |
| 2018/0297695 A1 | 10/2018 | Ramirez-Serrano | |
| 2019/0202449 A1 | 7/2019 | Taveira et al. | |
| 2019/0206266 A1 | 7/2019 | Taveira et al. | |
| 2019/0206267 A1 | 7/2019 | Taveira et al. | |
| 2019/0206268 A1 | 7/2019 | Taveira et al. | |
| 2019/0225327 A1 | 7/2019 | Kidakarn | |

FOREIGN PATENT DOCUMENTS

| | | |
|---|---|---|
| DE | 202013006196 U1 | 10/2014 |
| GB | 2483881 A | 3/2012 |
| KR | 20100027683 A | 3/2010 |
| WO | 2010135727 A1 | 11/2010 |
| WO | 2014027945 A1 | 2/2014 |
| WO | 2016053194 A1 | 4/2016 |
| WO | 2017043694 A1 | 3/2017 |
| WO | 2017086234 A1 | 5/2017 |
| WO | 2017168423 A1 | 10/2017 |
| WO | 2018032924 A1 | 2/2018 |

OTHER PUBLICATIONS

Dji et al., "PHANTOM 4: Prop Guards Installation Guide", Apr. 20, 2016 (Apr. 20, 2016), XP055546279, 5 Pages, Retrieved from the Internet: URL:https://dl.djicdn.com/downloads/phantom_4/en/En_Phantom_4_Prop_Guard_User Guide_160420.pdf [retrieved on Jan. 23, 2019].
International Search Report and Written Opinion—PCT/US2018/063766—ISA/EPO—dated Mar. 29, 2019. 13 pages.

* cited by examiner

ADJUSTABLE OBJECT AVOIDANCE PROXIMITY THRESHOLD BASED ON PREDICTABILITY OF THE ENVIRONMENT

BACKGROUND

Robotic vehicles, such as aerial robotic vehicles or "drones," are often used for a variety of applications, such as surveillance, photography, and/or cargo delivery. Many robotic vehicles use obstacle avoidance systems that work in conjunction with vehicle control systems to avoid hitting people, property, and objects. For example, once a robotic vehicle detects a nearby object, the obstacle avoidance system executing within the controller may prevent the robotic vehicle from approaching the object closer than some minimum distance (which is referred to herein as a "proximity threshold"). The proximity threshold is typically a fixed distance. In the case of aerial robotic vehicles that includes propeller blades, the proximity threshold may be a few feet to avoid damage and/or injury from contact with the spinning propeller blades.

SUMMARY

Various embodiments include devices, systems, and methods for operating a robotic vehicle that take into account conditions that may impact the ability of the robotic vehicle to avoid colliding with objects. Various embodiments may include a processor of the robotic vehicle monitoring environmental or other conditions affecting predictability of control or navigation of the robotic vehicle, and in response to determining that control or navigation of the robotic vehicle is or could be compromised by the environmental or other conditions, adjusting a proximity threshold used in a collision avoidance system consistent with an effect on the control or navigation of the robotic vehicle of the environmental or other conditions. Some embodiments may further include monitoring the environmental or other conditions affecting control or navigation of the robotic vehicle for change, and returning the proximity threshold to a default value in response to determining that control or navigation of the robotic vehicle are no longer compromised by the environmental or other conditions.

In some embodiments, monitoring environmental or other conditions affecting predictability of control or navigation of the robotic vehicle may include operating the robotic vehicle to remain in a set position or follow a defined path, monitoring positions of the robotic vehicle to detect deviations from the set position or follow a defined path, and determining a degree of control or navigation unpredictability based on observed deviations from the set position or follow a defined path.

Some embodiments may further include obtaining sensor data from one or more sensors configured to detect one or more objects in a vicinity of the robotic vehicle, determining, based on the sensor data, whether one or more objects in the vicinity of the robotic vehicle pose an obstacle or potential obstacle to the robotic vehicle, and in response to determining that one or more objects in the vicinity of the robotic vehicle pose an obstacle or potential obstacle to the robotic vehicle: determining a classification of an object posing an obstacle or potential obstacle to the robotic vehicle; further adjusting the proximity threshold based on the classification of the object posing an obstacle or potential obstacle to the robotic vehicle; and controlling the robotic vehicle using the further adjusted proximity threshold for collision avoidance. In some embodiments, further adjusting the proximity threshold based on the classification of the object posing an obstacle or potential obstacle to the robotic vehicle may include increasing the proximity threshold adjusted for environmental or other conditions affecting control or navigation of the robotic vehicle by an amount corresponding to the classification of the object and unpredictability of the object. In some embodiments, determining a classification of the object posing an obstacle or potential obstacle to the robotic vehicle may include determining whether the object is animate object or inanimate object, and further adjusting the proximity threshold based on the classification of the object may include one of increasing the adjusted proximity threshold in response to the classification of the object being animate or decreasing the proximity threshold in response to the classification of the object being inanimate. In some embodiments, adjusting the proximity threshold setting in the collision avoidance system based on the classification of the object may include determining a degree of movement unpredictability of the object corresponding to the determined classification of the object. In such embodiments, determining the degree of movement unpredictability of the object corresponding to the determined classification of the object may include accessing a data structure in memory for the degree of movement unpredictability correlated to the classification of the object. Some embodiments may further include returning the proximity threshold setting in the collision avoidance system to the proximity threshold adjusted consistent with the effect on the control or navigation of the robotic vehicle of the environmental or other conditions in response to determining that there are no objects in the vicinity of the robotic vehicle posing an obstacle or potential obstacle to the robotic vehicle.

In some embodiments, determining a classification of an object posing an obstacle or potential obstacle to the robotic vehicle may include determining a classification for all objects posing an obstacle or potential obstacle to the robotic vehicle. Such embodiments may further include generating a map of all objects posing an obstacle or potential obstacle to the robotic vehicle in which the proximity threshold adjusted consistent with the effect on the control or navigation of the robotic vehicle of the environmental or other conditions and a further distance corresponding to each object based on the object's classification are added as an exclusion perimeter around the object's volume, determining a detour that remains outside the exclusion perimeter of all detected obstacles, and controlling the robotic vehicle to execute the detour.

Some embodiments may include a processor implemented method for operating a robotic vehicle that includes obtaining data from one or more sensors configured to detect one or more objects in a vicinity of the robotic vehicle, determining, based on the sensor data, whether one or more objects in the vicinity of the robotic vehicle pose an obstacle or potential obstacle to the robotic vehicle, and in response to determining that one or more objects in the vicinity of the robotic vehicle pose an obstacle or potential obstacle to the robotic vehicle: determining a classification of an object posing an obstacle or potential obstacle to the robotic vehicle; adjusting a proximity threshold of a collision avoidance system to accommodate movement unpredictability of the object based on the classification of the object posing an obstacle or potential obstacle to the robotic vehicle, and controlling the robotic vehicle using the adjusted proximity threshold for collision avoidance.

Further embodiments include a robotic vehicle having a processor configured with processor-executable instructions to perform operations of any of the methods summarized above. Further embodiments include a processing device for use in a robotic vehicle configured to perform operations of any of the methods summarized above. Further embodiments include a non-transitory processor-readable media having stored thereon processor-executable instructions configured to cause a processor of a robotic vehicle to perform operations of any of the methods summarized above.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1A:
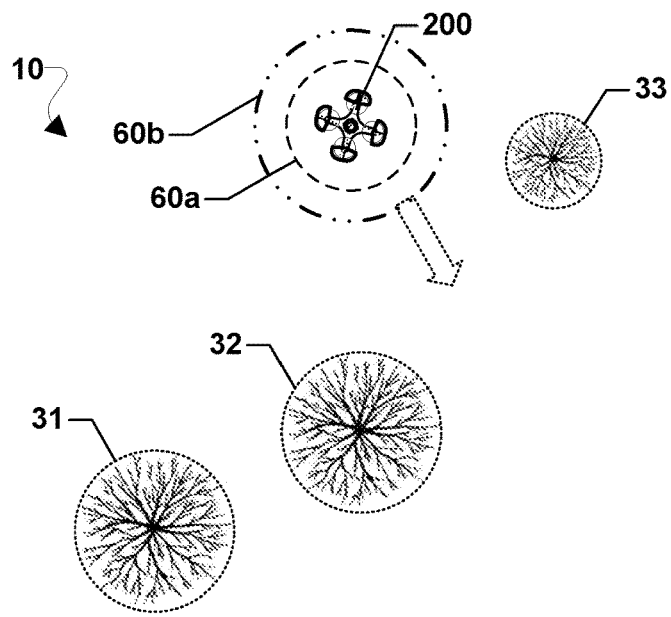
FIG. 1A is a plan view of an environment in which a robotic vehicle avoids obstacles by at least a proximity threshold that depends upon the predictability of the operating environment or conditions in accordance with various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include methods and robotic vehicle processing devices implementing such methods for automatically adjusting the minimum distance that a robotic vehicle is permitted to approach an object by a collision avoidance system based upon the unpredictability in the environment affecting the ability of the robotic vehicle to maneuver and navigate accurately and/or the nature and unpredictability of nearby objects. Adjusting the minimum approach distance or proximity threshold used in a collision avoidance system based on unpredictability in the environment and/or of nearby obstacles or objects enables robotic vehicles to operate with greater flexibility than is feasible using a fixed proximity threshold, while remaining a safe distance away from objects. In some embodiments, the threshold distance used by a collision avoidance system for avoiding objects may be adjusted by an amount or factor to ensure collisions are avoided despite impacts on navigational and/or control precision caused by environmental or other conditions. In some embodiments, the threshold distance used by a collision avoidance system for avoiding objects may be adjusted by an amount or factor that accommodates unpredictability in object's movements determined based on a classification of the object. In some embodiments, the threshold distance used by a collision avoidance system for avoiding objects may be based on a threshold distance appropriate for the object or type of object plus an adjustment that accommodates unpredictability in the object's movements determined based on a classification of the object. In some embodiments, the threshold distance may be based on a threshold distance appropriate for the object or type of object plus an adjustment that accommodates unpredictability in object's movements determined with both based on a classification of the object, with an additional adjustment by an amount or factor to ensure collisions are avoided despite impacts on navigational and/or control precision caused by environmental or other conditions.

In some embodiments, a processor of the robotic vehicle may determine a degree to which environmental or other conditions may compromise the ability of the robotic vehicle to maneuver and/or navigate with precision. Examples of unpredictable or low certainty environmental conditions that may compromise maneuvering and/or navigational precision include wind (particularly gusty winds) for aerial vehicles, precipitation, fog (which can limit visibility for navigation cameras), waves and current for waterborne vehicles, ice and snow for land based vehicles, and the like. Such environmental conditions can change rapidly or affect the control of a robotic vehicle faster than a control system can respond, and thus can decrease the precision by which the robotic vehicle can maneuver and maintain navigational/positional control. For example, if an aerial robotic vehicle maneuvering to avoid a collision (e.g., under control of a collision avoidance system) is hit by a gust of wind, the robotic vehicle could be pushed closer to an object than the proximity threshold before the collision avoidance system can react and redirect the robotic vehicle. Examples of other conditions that may compromise the ability of the robotic vehicle to maneuver and/or navigate include damage to propellers, wheels or wings or control elements of the vehicle, structural damage, loose or shifting payloads, obstructions on or damage to navigation cameras, damage to radar or lidar sensors, interruptions or degradation of signals from navigation satellites, and the like. For example, if an aerial robotic vehicle maneuvering to avoid a collision (e.g., under control of a collision avoidance system) experiences a shift in payload, the robotic vehicle could drift closer to an object than the proximity threshold before the collision avoidance system can react and redirect the robotic vehicle. In some embodiments, the processor may determine the degree to which a number of environmental or other conditions combine to compromise maneuvering and/or navigational precision. In some embodiments, the processor may determine environmental or other conditions from observing the environment and/or operations of the robotic vehicle. In some embodiments, the processor may determine environmental or other conditions from external sources (e.g., a weather service).

In some embodiments, the classification may be whether the object or obstacle is animate (and thus mobile) or inanimate (and thus immobile). In some embodiments, the threshold distance appropriate for the object classification may depend upon the vulnerability or importance the object or obstacle, such as whether the object or obstacle is classified as a human, an animal, a structure, an automobile, artwork, glassware, etc. The adjustment to the proximity threshold to accommodate unpredictability of the object or obstacle may vary depending upon the type or classification of the object or obstacle, such as assigning a larger proximity threshold to children, which may behave unpredictably in the presence of a robotic vehicle, than to adults, which can be expected to behave in a more predictable manner. For example, dogs may be assigned a relatively large adjustment to the proximity threshold to account the fact that dogs often behave unpredictably, including chasing after robotic vehicles. The adjustment to the proximity threshold may accommodate both the degree to which movements may be unpredictable and a speed or magnitude of unpredictable movements. For example, objects (e.g., animals) capable of fast movements (e.g., dogs, birds, etc.) may be assigned a larger adjustment to proximity thresholds than objects that move relatively slowly (e.g., people, cows, gates, etc.). A default proximity threshold and adjustment for unpredictability may be used for objects for which a classification is not determined.

In some embodiments, a processor of a robotic vehicle may determine a classification for an object that is being approached, and adjust the proximity threshold used by the collision avoidance system based on that object's classification plus an adjustment for unpredictability of environmental or other conditions. In some embodiments, the processor of the robotic vehicle may classify all detected objects, determine an exclusion perimeter for each object based on each object's unpredictability plus an adjustment for unpredictability in environmental or other conditions that might impact navigational control of the robotic vehicle, and determine a detour flight path to remain outside the exclusion perimeter of all detected objects.

As used herein, the terms "robotic vehicle" and "drone" refer to one of various types of vehicles including an onboard computing device configured to provide some autonomous or semi-autonomous capabilities. Examples of robotic vehicles include but are not limited to: robotic vehicles, such as an unmanned aerial vehicle (UAV); ground vehicles (e.g., an autonomous or semi-autonomous car, a vacuum robot, etc.); water-based vehicles (i.e., vehicles configured for operation on the surface of the water or under water); space-based vehicles (e.g., a spacecraft or space probe); and/or some combination thereof. In some embodiments, the robotic vehicle may be manned. In other embodiments, the robotic vehicle may be unmanned. In embodiments in which the robotic vehicle is autonomous, the robotic vehicle may include an onboard computing device configured to maneuver and/or navigate the robotic vehicle without remote operating instructions (i.e., autonomously), such as from a human operator (e.g., via a remote computing device). In embodiments in which the robotic vehicle is semi-autonomous, the robotic vehicle may include an onboard computing device configured to receive some information or instructions, such as from a human operator (e.g., via a remote computing device), and autonomously maneuver and/or navigate the robotic vehicle consistent with the received information or instructions. In some implementations, the robotic vehicle may be an aerial vehicle (unmanned or manned), which may be a rotorcraft or winged aircraft. For example, a rotorcraft (also referred to as a multirotor or multicopter) may include a plurality of propulsion units (e.g., rotors/propellers) that provide propulsion and/or lifting forces for the robotic vehicle. Specific non-limiting examples of rotorcraft include tricopters (three rotors), quadcopters (four rotors), hexacopters (six rotors), and octocopters (eight rotors). However, a rotorcraft may include any number of rotors.

The term "obstacle" is used herein to refer to an object that a robotic vehicle must maneuver around to avoid a collision.

The term "proximity threshold" is used herein to refer to a minimum distance between an object and a robotic vehicle that a collision avoidance system will permit before controlling the robotic vehicle to stop or change a direction of travel away from the object. Similarly, the term "exclusion perimeter" is used herein to refer to a distance around an obstacle that a robotic vehicle should avoid to ensure that the robotic vehicle remains outside the proximity threshold. The term "adjusted proximity threshold" is used herein to refer to the minimum distance between an object and the robotic vehicle that the collision avoidance system will permit including adjustments that account for degradation of maneuvering and/or navigational precision that may be caused by environmental or other conditions, and/or for unpredictability in the movements or position of nearby objects.

Operations of a robotic vehicle 200 within an environment 10 that includes various trees 31, 32, 33 according to various embodiments are illustrated in FIG. 1A. When the robotic vehicle 200 approaches objects (e.g., trees 31-33), a processor within the robotic vehicle 200 may process data received from onboard sensors (e.g., a camera, radar, lidar, etc.) to determine a type or classification of nearby objects. In the example illustrated in FIG. 1A, the processor of the robotic vehicle 200 may identify the nearby objects 31-33 as trees or non-animate objects. In some embodiments, the processor may determine that nearby objects 31-33 are not classified as sensitive or valuable objects, particularly if the objects do not fit a given or preloaded classification. In the illustrated example in which the nearby objects 31-33 are trees (i.e., not fragile or valuable), the processor may not adjust the proximity threshold 60a, and thus the collision avoidance system implemented in the processor may remain at a default value. In some embodiments, the default value of the proximity threshold 60a may depend upon whether the robotic vehicle 200 is or is not equipped with propeller guards. With the proximity threshold 60a set at the default value, the robotic vehicle 200 is able to maneuver or follow user control commands to fly between the detected objects, such as along a path between trees 32 and 33.

Additionally, the processor of the robotic vehicle 200 may monitor environmental or other conditions regarding their unpredictability and potential impact on the ability of the robotic vehicle to maneuver and maintain precise navigational control. For example, if the processor determines that the avionics system has issued sudden maneuver instructions to maintain position (e.g., in a hover) or follow a navigational route, the processor may determine that environmental conditions are impacting positional control of the robotic vehicle, and increase the proximity threshold to accommodate increased errors in positional control. As another example, the processor may receive information from broadcast weather forecasts regarding wind conditions, and increase the proximity threshold to accommodate errors in positional control that may arise from high winds and gusty conditions.

As a result of adjusting the proximity threshold to accommodate uncertainty in the navigational control the robotic vehicle 200, the adjusted proximity threshold 60b used by the collision avoidance system may be larger than the default proximity threshold 60a when there is no or low uncertainty in environmental conditions. With a larger adjusted proximity threshold 60b, the robotic vehicle 200 will avoid obstacles such as the trees 31-33 by a larger distance.

Figure 1B:
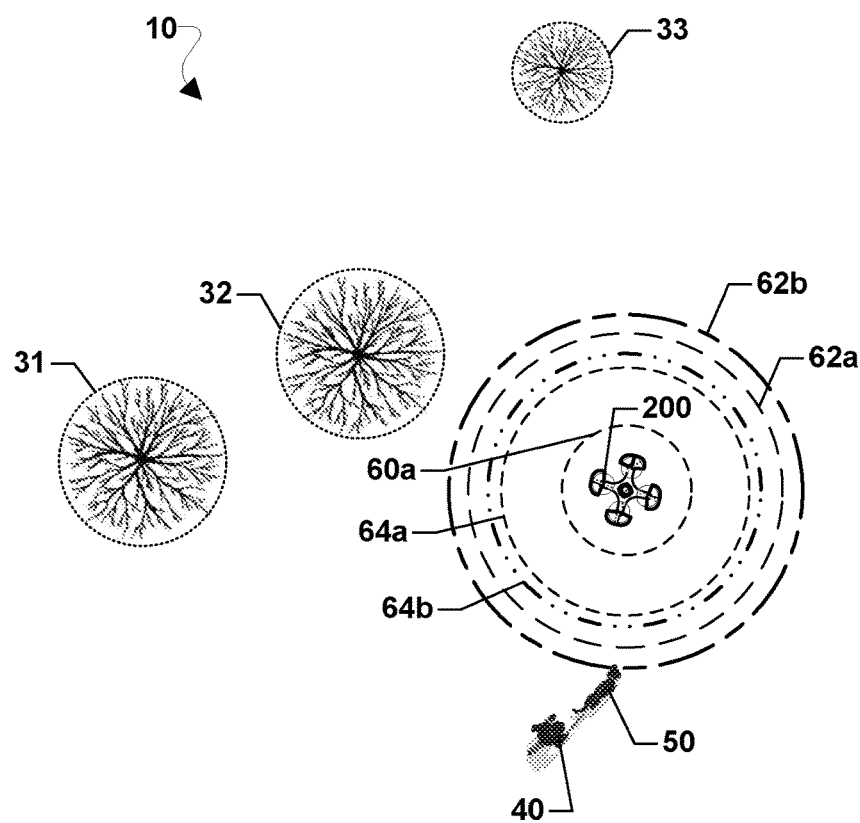
FIG. 1B is a plan view of an environment in which a robotic vehicle avoids obstacles by at least a proximity threshold that depends upon the predictability of the operating environment or conditions and a classification and unpredictability of each obstacle in accordance with various embodiments.
Figure 1C:
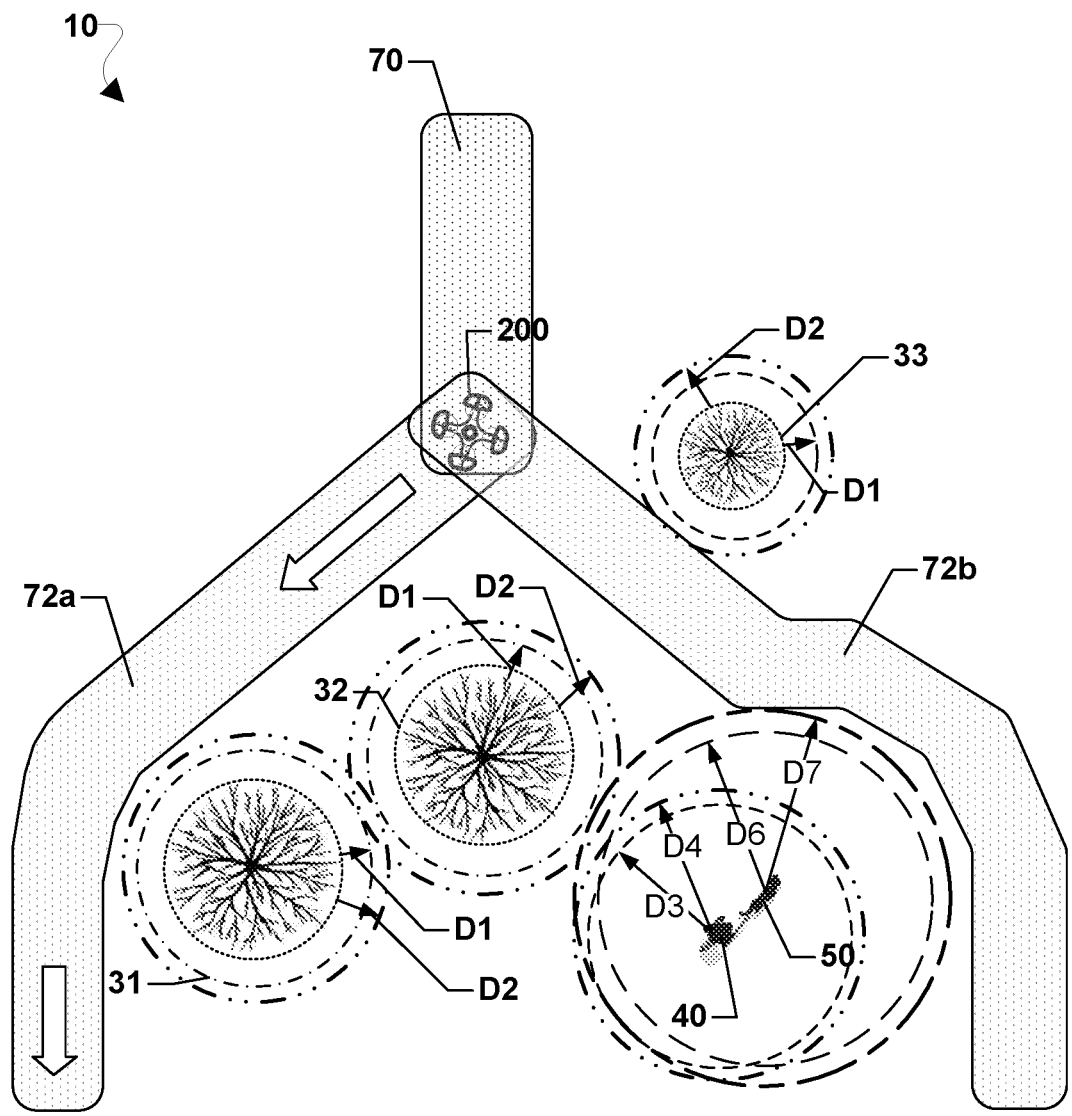
FIG. 1C is a plan view of an environment of FIG. 1A in which the robotic vehicle performs path planning to avoid various obstacles by exclusion perimeter distances corresponding to the predictability of the operating environment or conditions and a determine classification of each obstacle in accordance with various embodiments.

Referring to the example illustrated in FIG. 1B, having transited the trees 31-33, the robotic vehicle 200 may approach a person 40 walking a dog 50. With reference to FIGS. 1A-1C, upon detecting these objects, the processor of the robotic vehicle 200 may process sensor data (e.g., camera image data) and classify the objects as a human and animal dog. Based upon this classification, the processor may adjust the proximity threshold used by the collision avoidance system from the default proximity threshold 60a to a proximity threshold consistent with or corresponding to a human (proximity threshold 64a) and a dog (proximity threshold 62a). The larger proximity thresholds 62a, 64b used by the collision avoidance system ensure that the robotic vehicle 200 will give the person 40 and dog 50 a wider berth to accommodate unpredictability in their movements (as well as their increased vulnerability to collisions compared to inanimate objects). Further, the proximity threshold 64a used by the collision avoidance system for avoiding the person 40 may be different (e.g., smaller) than the proximity threshold 62a used by the collision avoidance system for avoiding the dog 50 because the dog is more unpredictable and can move faster than the person.

Additionally, the processor of the robotic vehicle 200 may monitor environmental or other conditions regarding their unpredictability and potential impact on the ability to maneuver and maintain precise navigational control of the robotic vehicle, and further adjust proximity thresholds accordingly. For example, if the processor notes that the avionics system has exhibited difficulty maintaining maneuver or navigation control of the robotic vehicle, the processor may increase the proximity threshold to accommodate such control errors. As another example, the processor may receive information from broadcast weather forecasts regarding wind conditions, and increase the proximity threshold to accommodate errors in positional control that may arise from high winds and gusty conditions.

Increasing the proximity threshold to accommodate unpredictability in environmental or other conditions may result in an adjusted proximity threshold 64b for a person 40 and a different adjusted proximity threshold 62b for a dog 50. In the example illustrated in FIG. 1B in which the person 40 and the dog 50 are together, the processor of the robotic vehicle 200 may implement the largest of the adjusted proximity thresholds (i.e., the adjusted proximity threshold 62b for the dog 50) in the collision avoidance system.

Thus, various embodiments enable the robotic vehicle collision avoidance system to dynamically adjust how close the robotic vehicle 200 is permitted to approach various objects while operating in an environment in order to ensure the robotic vehicle does not approach any object closer than a minimum distance (e.g., a default proximity threshold) despite unpredictability in environmental and other conditions and unpredictability in movements of various objects.

FIG. 1C illustrates a further embodiment in which the proximity threshold for various objects detected by robotic vehicle under observed environmental or other conditions may be used in planning a path to avoid approaching any object closer than an appropriate proximity threshold despite unpredictability in environmental and other conditions and unpredictability in movements of various objects. With reference to FIGS. 1A-1C, a robotic vehicle 200 transiting along a path 70 will eventually detect objects in its path that includes trees 31-33, a human 40, and a dog 50. In some embodiments, a processor of the robotic vehicle 200 may evaluate the detected objects, such as through visual processing and image recognition methods, to determine a type or classification of each of the objects 31-33, 40, 50. The processor may then determine an appropriate proximity threshold for each of the observed objects 31-34, 40, 50 that should be implemented in the collision avoidance system based upon the nature and unpredictability of the objects. Because the various objects have differing appropriate proximity threshold in view of their respective vulnerability to collision and movement unpredictability, the processor may take into account all of the determined proximity thresholds in order to plot an alternative path around all detected objects. In order to do so efficiently, the processor may generate an internal map of each of the detected objects that adds an exclusion perimeter around each object based upon the proximity threshold appropriate for that object in view of that object's vulnerability to collision and movement unpredictability. Such a map enables the processor to then determine a detour or path 72a, 72b around the detected objects that will ensure the robotic vehicle 200 does not approach any of the objects closer than their corresponding proximity threshold.

For example, the processor of the robotic vehicle 200 may generate a map in which trees 31-33 are assigned an exclusion radius that includes a distance D1 that is appropriate for trees considering their low vulnerability to collision and their relatively small movement unpredictability. Similarly, the map generated by the processor of the robotic vehicle 200 may assign an exclusion radius D3 about the person 40, and an exclusion radius D6 about the dog 50 that is consistent with their relatively high vulnerability to collision and their respective movement unpredictability. Thus, the exclusion radius D6 for the dog 50 may be larger than the exclusion radius D3 for the person 40 because dogs have a tendency to chase robotic vehicles and are fast, while people are vulnerable to collisions but are less likely to move in an unpredictable manner. Thus, some embodiments enable a robotic vehicle 200 to determine a detour or path 72a, 72b around the detected objects that accommodates unpredictability in the movements of the objects.

Additionally, the processor of the robotic vehicle 200 may increase the exclusion radius assigned to each object within the map to accommodate unpredictability in environmental and other conditions. For example, if an aerial robotic vehicle is maneuvering in gusty wind conditions, the processor may increase the exclusion radius on each object by a factor consistent with a decrease in the precision of vehicle maneuvers and navigation that could be caused by unpredictable wind gusts. Thus, the exclusion radius about the trees 31-33 may be increased to include a distance D2. Similarly, the exclusion radius about the person 40 may be increased to distance D4 and the exclusion radius about the dog of 50 may be increased to distance D7. Thus, some embodiments enable a robotic vehicle 200 to determine a detour or path 72a, 72b around the detected objects that accommodates unpredictability in the movements of objects and compensates for unpredictability in environmental and other conditions affecting the ability of the robotic vehicle to maneuver and navigate with precision.

Figure 2:
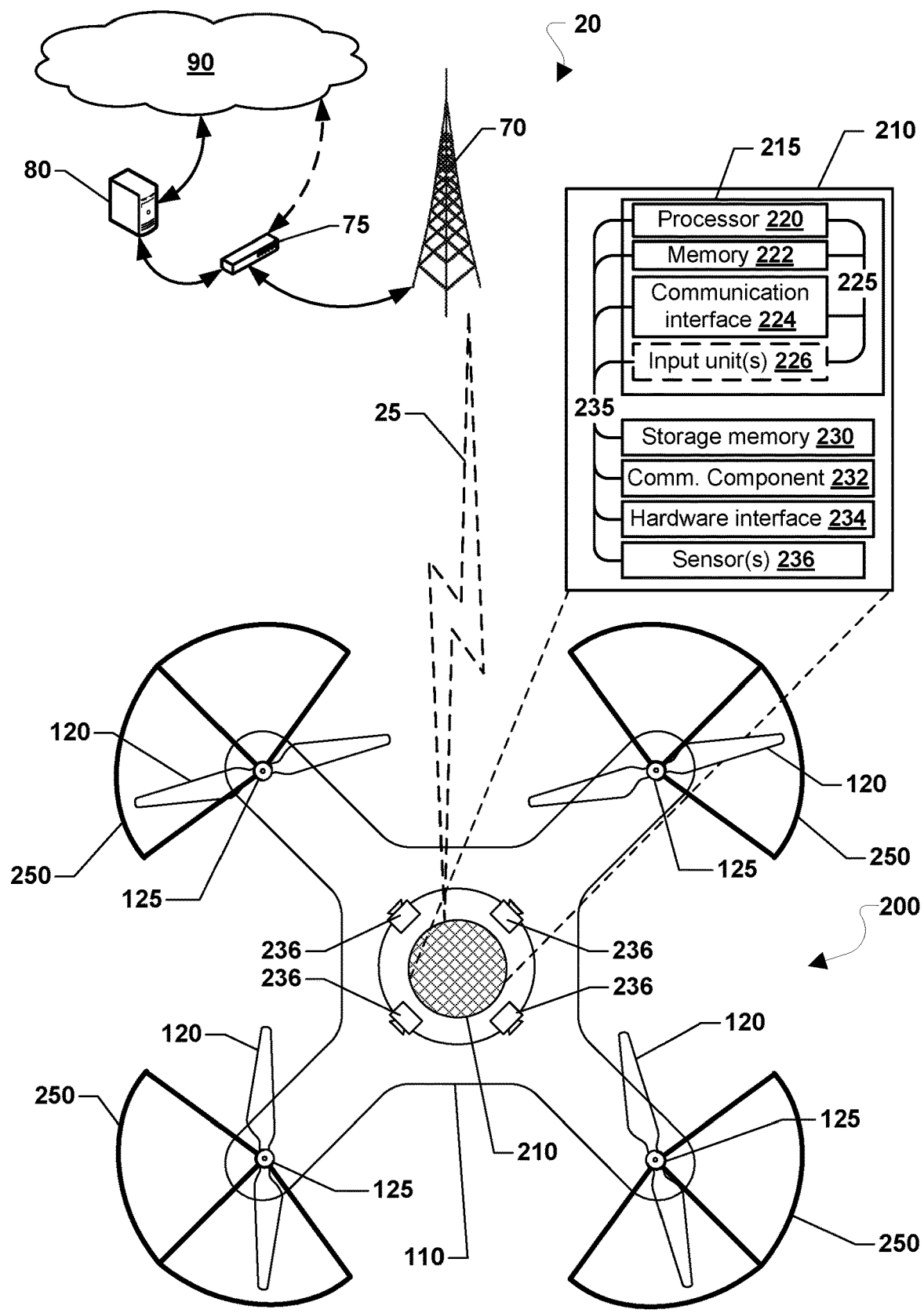
FIG. 2 is a block diagram illustrating components of a robotic vehicle and a ground station suitable for use in various embodiments.

Various embodiments may be implemented within a variety of robotic vehicles configured to communicate with one or more communication networks, an example of which in the form of an aerial robotic vehicle 200 suitable for use with various embodiments is illustrated in FIG. 2. With reference to FIGS. 1A-2, an aerial robotic vehicle 200 operating in a mission environment 20 may include a plurality of rotors 120 (e.g., four rotors), each driven by a corresponding motor 125. A body 110 of the aerial robotic vehicle 200 may support the plurality of rotors 120 and motors 125. In some instances, the robotic vehicle 110 may include propeller guards 250 positioned about the rotors 120 to reduce the damage that a collision may cause to an object, such as a human.

An aerial robotic vehicle 200 may include one or more onboard sensors, such as one or more cameras 236. The aerial robotic vehicle 200 may include a processing device 210, which may further include one or more attitude sensors, such as an altimeter, a gyroscope, accelerometers, an electronic compass, a satellite positioning system receiver, etc., that may be used by the processor 220 to determine vehicle attitude and location information for controlling flight and navigating.

Cameras 236 may be disposed in various locations on the aerial robotic vehicle 200 and different types of camera may be included. For example, a first set of cameras 236 may face a side of each of the rotors 120 in the plane of rotation thereof, such as mounted near a central part of the aerial robotic vehicle 200. Additionally, or alternatively, second set of cameras 236 may be mounted under the rotors 120, such as in a position configured to detect whether propeller guards 250 are present. The aerial robotic vehicle 200 may also include other types of sensors, including detection and ranging sensors, such as radar, sonar, lidar, and the like.

Image data generated by the cameras 236, as well as data from one or more other types of sensors (e.g., radar, sonar, lidar, etc.), may be used by an object avoidance system executing in the processor 220. In various embodiments, image data received from cameras 236, as well as other sensor data, may be processed by an object avoidance system to detect objects or obstacles in the vicinity of the robotic vehicle 200 during operation.

The aerial robotic vehicle 200 may include a processing device 210 that may be coupled to each of the plurality of motors 125 that drive the rotors 120. The processing device 210 may be configured to monitor and control the various functionalities, sub-systems, and components of the aerial robotic vehicle 200. For example, the processing device 210 may be configured to monitor and control various modules, software, instructions, circuitry, hardware, etc. related to propulsion, navigation, power management, sensor management, and/or stability management.

The processing device 210 may house various circuits and devices used to control the operation of the aerial robotic vehicle 200. For example, the processing device 210 may include a processor 220 that directs the control of the aerial robotic vehicle 200. The processor 220 may include one or more processors configured to execute processor-executable instructions (e.g., applications, routines, scripts, instruction sets, etc.) to control flight, antenna usage, and other operations of the aerial robotic vehicle 200, including operations of various embodiments. In some embodiments, the processing device 210 may include memory 222 coupled to the processor 220 and configured to store data (e.g., flight plans, obtained sensor data, received messages/inputs, applications, etc.). The processor 220 and memory 222 may be configured as or be included within a system-on-chip (SoC) 215 along with additional elements such as (but not limited to) a communication interface 224, one or more input units 226, non-volatile storage memory 230, and a hardware interface 234 configured for interfacing the SoC 215 with hardware and components of the aerial robotic vehicle 200. Components within the processing device 210 and/or the SoC 215 may be coupled together by various circuits, such as a bus 225, 235 or another similar circuitry.

The processing device 210 may include more than one SoC 215 thereby increasing the number of processors 220 and processor cores. The processing device 210 may also include processors 220 that are not associated with the SoC 215. Individual processors 220 may be multi-core processors. The processors 220 may each be configured for specific purposes that may be the same as or different from other processors 220 of the processing device 210 or SoC 215. One or more of the processors 220 and processor cores of the same or different configurations may be grouped together. A group of processors 220 or processor cores may be referred to as a multi-processor cluster.

The terms "system-on-chip" or "SoC" are used herein to refer to a set of interconnected electronic circuits typically, but not exclusively, including one or more processors (e.g., 220), a memory (e.g., 222), and a communication interface (e.g., 224). The SoC 215 may include a variety of different types of processors 220 and processor cores, such as a general purpose processor, a central processing unit (CPU), a digital signal processor (DSP), a graphics processing unit (GPU), an accelerated processing unit (APU), a subsystem processor of specific components of the processing device, such as an image processor for a camera subsystem or a display processor for a display, an auxiliary processor, a single-core processor, and a multicore processor. An SoC 215 may further embody other hardware and hardware combinations, such as a field programmable gate array (FPGA), an application-specific integrated circuit (ASIC), other programmable logic device, discrete gate logic, transistor logic, performance monitoring hardware, watchdog hardware, and time references. Integrated circuits may be configured such that the components of the integrated circuit reside on a single piece of semiconductor material, such as silicon.

In various embodiments, the processing device 210 may include or be coupled to one or more communication components 232, such as a wireless transceiver, an onboard antenna, and/or the like for transmitting and receiving wireless signals through the wireless communication link 25. The one or more communication components 232 may be coupled to the communication interface 224 and may be configured to handle wireless wide area network (WWAN) communication signals (e.g., cellular data networks) and/or wireless local area network (WLAN) communication signals (e.g., Wi-Fi signals, Bluetooth signals, etc.) associated with ground-based transmitters/receivers (e.g., base stations, beacons, Wi-Fi access points, Bluetooth beacons, small cells (picocells, femtocells, etc.), etc.). The one or more communication components 232 may receive data from radio nodes, such as navigation beacons (e.g., very high frequency (VHF) omni-directional range (VOR) beacons), Wi-Fi access points, cellular network base stations, radio stations, etc.

The processing device 210, using the processor 220, the one or more communication components 232, and an antenna may be configured to conduct wireless communications with a variety of remote computing devices, examples of which include the base station or cell tower (e.g., base station 20), a beacon, server, a smartphone, a tablet, or another computing device with which the aerial robotic vehicle 200 may communicate. The processor 220 may establish the wireless communication link 25 via a modem and the antenna. In some embodiments, the one or more communication components 232 may be configured to support multiple connections with different remote computing devices using different radio access technologies. In some embodiments, the one or more communication components 232 and the processor 220 may communicate over a secured communication link. The security communication links may use encryption or another secure means of communication in order to secure the communication between the one or more communication components 232 and the processor 220.

The aerial robotic vehicle 200 may operate in the mission environment 20 communicating with a base station 70, which may provide a communication link to a remote computing device 75 and/or a remote server 80 via a communication network 90. The base station 70 may provide the wireless communication link 25, such as through wireless signals to the aerial robotic vehicle 200. The remote computing device 75 may be configured to control the base station 70, the aerial robotic vehicle 200, and/or control wireless communications over a wide area network, such as providing a wireless access points and/or other similar network access point using the base station 70. In addition, the remote computing device 75 and/or the communication network 90 may provide access to a remote server 80. The aerial robotic vehicle 200 may be configured to communicate with the remote computing device 75 and/or the remote server 80 for exchanging various types of communications and data, including location information, navigational commands, data inquiries, and mission data.

Aerial robotic vehicles may navigate or determine positioning using altimeters or navigation systems, such as Global Navigation Satellite System (GNSS), Global Positioning System (GPS), etc. In some embodiments, the aerial robotic vehicle 200 may use an alternate source of positioning signals (i.e., other than GNSS, GPS, etc.). The aerial robotic vehicle 200 may use position information associated with the source of the alternate signals together with additional information (e.g., dead reckoning in combination with last trusted GNSS/GPS location, dead reckoning in combination with a position of the aerial robotic vehicle takeoff zone, etc.) for positioning and navigation in some applications. Thus, the aerial robotic vehicle 200 may navigate using a combination of navigation techniques, including dead-reckoning, camera-based recognition of the land features below and around the aerial robotic vehicle 200 (e.g., recognizing a road, landmarks, highway signage, etc.), etc. that may be used instead of or in combination with GNSS/GPS location determination and triangulation or trilateration based on known locations of detected wireless access points.

In some embodiments, the processing device 210 of the aerial robotic vehicle 200 may use one or more of various input units 226 for receiving control instructions, data from human operators or automated/pre-programmed controls, and/or for collecting data indicating various conditions relevant to the aerial robotic vehicle 200. For example, the input units 226 may receive input from one or more of various sensors, such as camera(s), microphone(s), position information functionalities (e.g., a global positioning system (GPS) receiver for receiving GPS coordinates), flight instruments (e.g., attitude indicator(s), gyroscope(s), anemometer, accelerometer(s), altimeter(s), compass(es), etc.), keypad(s), etc. In some embodiments, the processing device 210 may further be configured to use data received from the one or more sensors to monitor environmental and other conditions to detect a level of unpredictability, especially unpredictability or errors in the ability of the robotic vehicle 200 to maneuver and/or navigate with precision.

Aerial robotic vehicles may be winged or rotor craft varieties. For example, the aerial robotic vehicle 200 may be a rotary propulsion design that utilizes one or more rotors 120 driven by corresponding motors to provide lift-off (or take-off) as well as other aerial movements (e.g., forward progression, ascension, descending, lateral movements, tilting, rotating, etc.). The aerial robotic vehicle 200 is illustrated as an example of a robotic vehicle that may utilize various embodiments, but is not intended to imply or require that various embodiments are limited to a quad-rotor aircraft.

Figure 3:
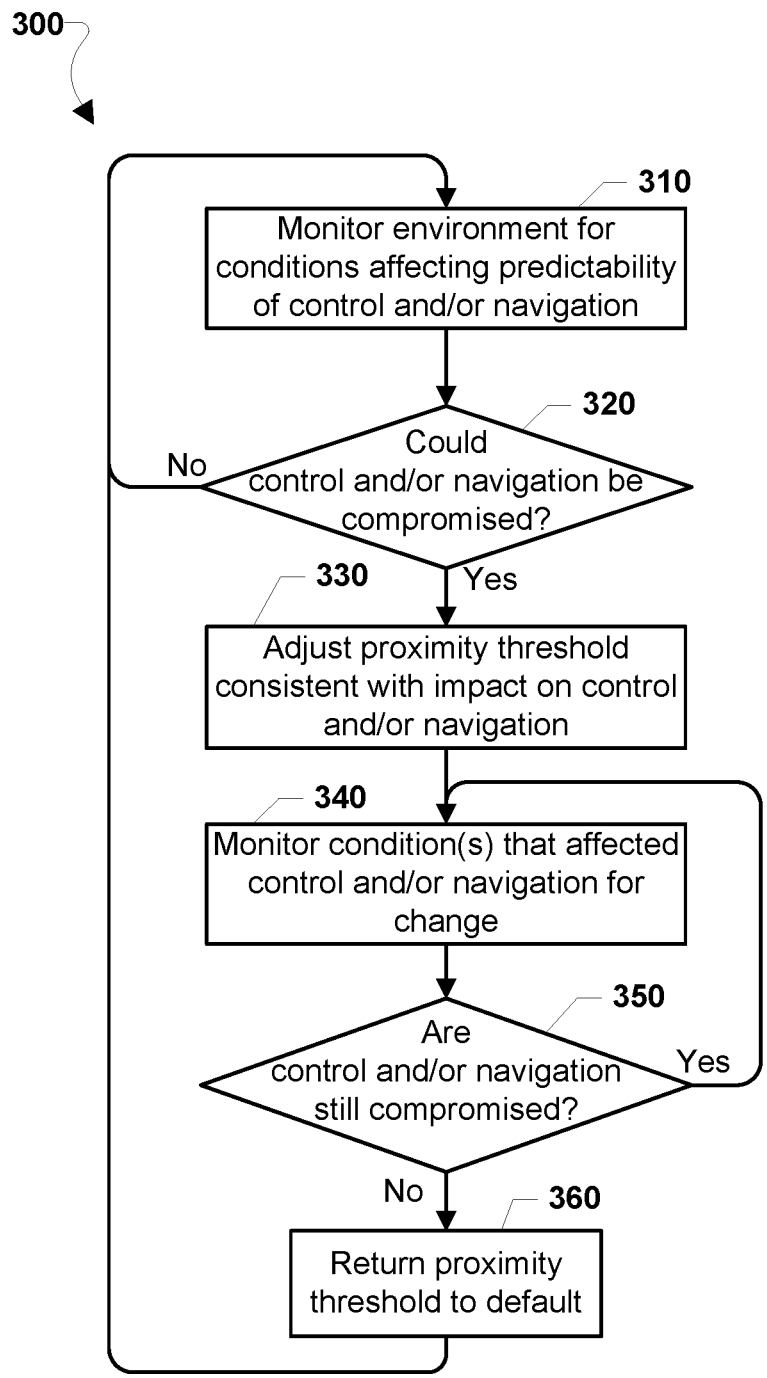
FIG. 3 is a process flow diagram illustrating a method for operating a robotic vehicle to avoid obstacles by at least a proximity threshold that compensates for unpredictability of the operating environment or conditions in accordance with various embodiments.

FIG. 3 illustrates a method 300 for adjusting the proximity threshold used by a collision avoidance system of a robotic vehicle to accommodate for unpredictability in environmental and other conditions according to some embodiments. With reference to FIGS. 1A-3, the method 300 may be performed by a processor, such as a processor (220) within a processing device (e.g., 210) of a robotic vehicle (e.g., 200) to detect obstacles (e.g., 120) and perform an action in response.

In block 310, the processor of the robotic vehicle may monitor various aspects of the environment or conditions affecting predictability of vehicle control and/or navigation. Such monitoring may involve a wide range of conditions and states that could impact the vehicle control and/or navigation capabilities. For example, the processor may monitor weather conditions by receiving data from various onboard instruments (e.g., cameras, an anemometer, accelerometers, thermometers, humidity sensors, GPS receivers, etc.) and/or by accessing weather-related information sources (e.g., via the Internet) to determine wind conditions, particularly the likelihood of gusts, detect the presence or likelihood of precipitation, detect fog (which can limit visibility for navigation cameras), measure waves and current for waterborne vehicles, detect ice and snow for land based vehicles, and the like. Such environmental conditions can change rapidly or affect the control of a robotic vehicle faster than a control system can respond, and thus can decrease the precision with which the robotic vehicle can maneuver and maintain navigational/positional control. Additionally, the processor may monitor conditions of the robotic vehicle that may affect the precision of maneuvers and navigation, such as structural integrity, payload position and movements, propeller conditions, and the like.

Also as part of the operations in block 310, the processor may monitor images from a camera or cameras used in navigation and obstacle detection to determine whether there are any conditions that may impact computer vision processing algorithms used for navigation and collision avoidance. For example, a number of different lighting and background conditions may affect the ability of such cameras to recognize surfaces, determine distances to surfaces, track objects within images, or otherwise perform certain image processing operations. Such conditions may affect the ability of the robotic vehicle to navigate around objects or even accurately determine the distance to objects, and thus potentially compromising the ability of the collision avoidance system to steer clear of objects. Examples of conditions that could impact computer vision algorithms include: flying over monochrome surfaces (e.g., solid black/white/red/green); flying over highly reflective surfaces; flying over water or transparent surfaces; flying in an area where the lighting conditions change frequently or drastically; flying over extremely dark (e.g., lux<10) or bright (e.g., lux>100,000) surfaces; flying over surfaces without clear patterns or texture; flying over surfaces with identical repeating patterns or textures (e.g., tile); and flying over small and fine objects (e.g., tree branches and power lines).

In determination block 320, the processor may determine whether there are any environmental or other conditions resulting in unpredictable impacts on robotic vehicle maneuvering or navigation that could compromise vehicle control or navigation. This determination may involve comparing potential forces on the robotic vehicle to control margins available to the vehicle control system. For example, the processor may determine that control and/or navigation of the robotic vehicle is or could be compromised if the forces on the vehicle from the environment or other conditions exceed or could exceed the ability of the vehicle control system to compensate.

In response to determining that control and/or navigation of the robotic vehicle are unlikely to be compromised by environmental or other conditions (i.e., determination block 320="No"), the processor may continue to monitor the environment in block 310.

In response to determining that control and/or navigation of the robotic vehicle are or could be compromised by environmental or other conditions (i.e., determination block 320="Yes"), the processor may adjust the proximity threshold consistent with the impact on or potential compromise of control and/or navigation due to the environmental or other conditions. For example, if the processor determines that environmental conditions (e.g., wind gusts) could result in the robotic vehicle being moved off position or course by a meter before the vehicle can react and recover, the processor may increase the proximity threshold be about one meter. Thus, adjusting the proximity threshold consistent with the environment's actual or potential impact on control and/or navigation enables the collision avoidance system to avoid objects by at least the default proximity threshold despite the potential that the environmental conditions could momentarily and unpredictably divert the robotic vehicle.

In block 340, the processor may monitor the environmental or other conditions affecting or potentially affecting the robotic vehicle's control and/or navigation for change.

In determination block 350, the processor may determine whether the robotic vehicle's control and/or navigation are still compromised or potentially compromised by the monitored environmental or other conditions. While the processor determines that the robotic vehicle's control and/or navigation are still compromised or potentially compromised by the monitored environmental or other conditions (i.e., determination block 350="Yes"), the processor may continue to monitor the environmental or other conditions affecting or potentially affecting the robotic vehicle's control and/or navigation for change in block 340.

In response to determining that the robotic vehicle's control and/or navigation are no longer compromised or potentially compromised by the monitored environmental or other conditions (i.e., determination block 350="No"), the processor may return the proximity threshold to a default value in block 360, and continue monitoring various aspects of the environment or conditions affecting predictability of control and/or navigation in block 310.

Thus, the method 300 enables the processor of a robotic vehicle to adjust the proximity threshold used in the collision avoidance system to accommodate unpredictability and reduced precision of the maneuvering and navigational control of the robotic vehicle as a result of environmental or other conditions.

Figure 4:
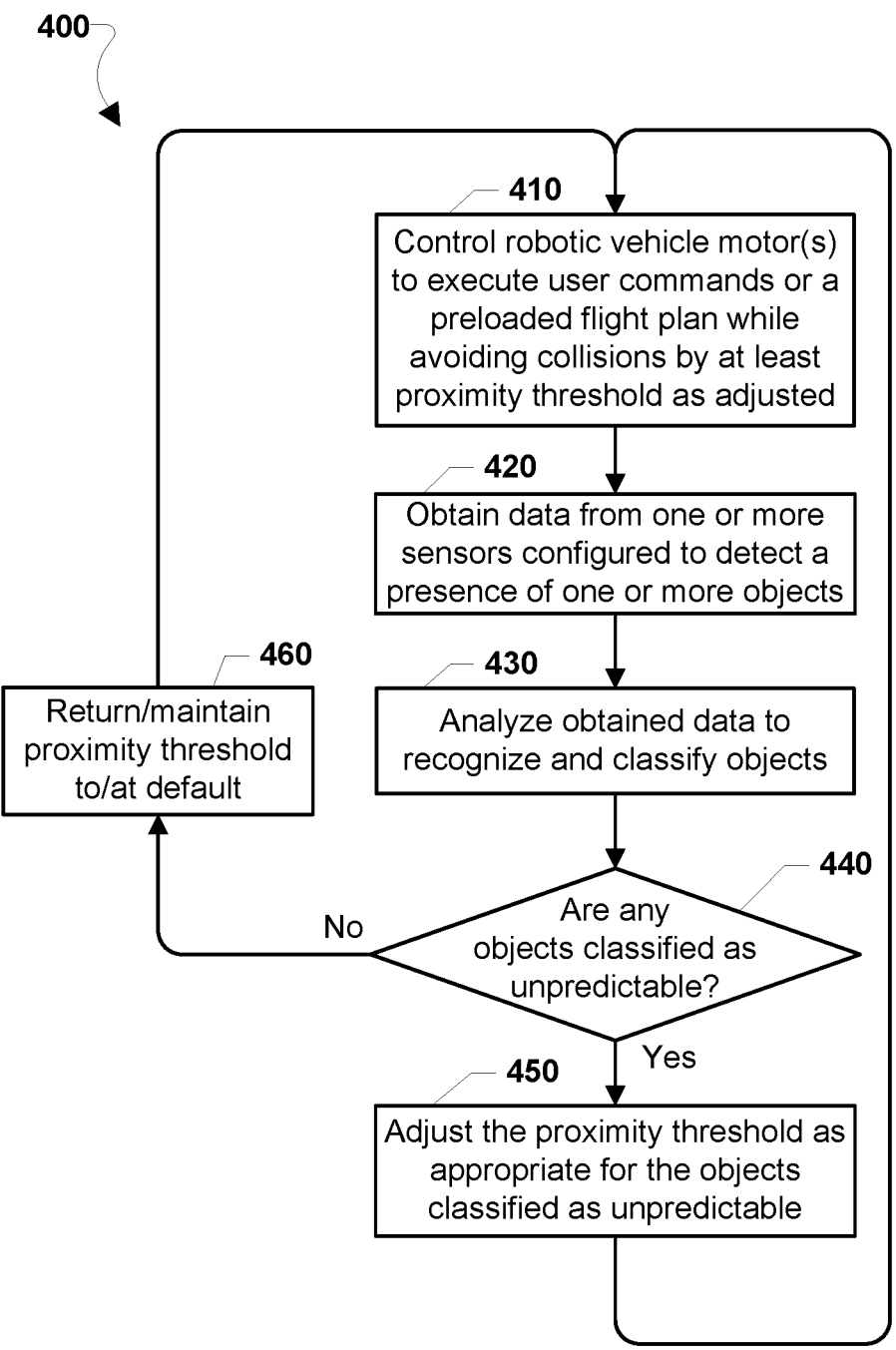
FIG. 4 is a process flow diagram illustrating a method for operating a robotic vehicle to avoid obstacles by at least a proximity threshold that compensates for unpredictability of an object in the environment in accordance with various embodiments.

FIG. 4 illustrates a method 400 for operating a robotic vehicle according to some embodiments. With reference to FIGS. 1A-4, the method 400 may be performed by a processor, such as a processor (220) within a processing device (e.g., 210) of a robotic vehicle (e.g., 200) to detect obstacles (e.g., 120) and perform an action in response.

In block 410, a processor of the robotic vehicle may provide control signals to control one or more motors of the robotic vehicle to execute user commands (e.g., a user controlled operation) or a preloaded flight plan while avoiding collisions by at least the proximity threshold (as may be adjusted as described). Initially the collision avoidance system may be operating using a default proximity threshold to determine when evasive maneuvers should be implemented when approaching obstacles. As the operations proceed, the proximity threshold may be adjusted to accommodate objects as described.

In block 420, the processor may obtain data from one or more sensors that are configured to detect a presence of one or more objects. Such sensors may include ranging sensors, such as radar, sonar, and lidar, which may be used to detect the presence in range to an object. Such sensors may also include imaging sensors, such as a camera or a set of cameras, that may be used to classify objects. For example, many robotic vehicles are equipped with cameras and a collision avoidance system capability (which may be implemented within a main controller) that uses data from the cameras to identify and avoid colliding with objects while operating under user control, autonomously or semi-autonomously. As another example, some robotic vehicles are equipped with cameras and a navigation system (which may be implemented within a main controller) configured for virtual image odometry (VIO) and/or simultaneous localization and mapping (SLAM) in which data from the cameras are used to identify objects and obstacles for use in autonomous navigation. Similarly, a processor (e.g., a main controller) of robotic vehicles equipped with radar and/or lidar sensors may use data from such sensors, either alone or in combination with data from cameras, to identify objects and obstacles for use in navigation and/or collision avoidance. In some implementations, the processor may detect and locate objects in the vicinity of the robotic vehicle based on ranging sensors, such as radar, sonar and/or lidar returns. In some implementations, the processor may receive image data from multiple cameras and/or radar or lidar sensors, which may enable the processor to determine distances to objects (e.g., through stereoscopy) as well as observe objects over a wide angle. Such sensor data may be stored in local memory, such as a buffer, to support data processing in subsequent operations.

In block 430, the processor may analyze data obtained from the one or more sensors to recognize and classify objects in the vicinity of the robotic vehicle. In some embodiments, the processor may use image recognition methods to distinguish objects within images and analyze the shapes of the objects to recognize or classify the objects. For example, the processor may compare image data to object recognition models to determine whether objects can be recognized as particular objects (e.g., the user based on facial recognition) or classified as certain types of objects (e.g., people, animals, trees, cars, buildings, etc.). As another example, using camera image data, the processor may perform image processing analysis to detect edges, masses and other features characteristic of objects within the field of view. As another example, the processor may detect objects in the vicinity of the robotic vehicle based on radar and/or lidar returns. In some embodiments, radar and/or lidar data may be used to detect and locate nearby objects, with that information then leveraged in image processing to characterize the detected objects.

As a further operation in block 430, the processor may analyze detected objects to determine an appropriate classification for each object. For example, the processor may perform image recognition algorithms on image data to determine whether an object is recognized as a particular type. Such image recognition processes may compare images of a particular object to databases of classified or classifiable objects to determine whether there is a likelihood of a match. Such image recognition processes may use machine learning to develop models for use in assigning classifications to objects.

In some embodiments, the processor may categorize objects in terms of a few broad classifications in block 430, such as whether the objects are animate or inanimate, or whether the type of object is known to be fragile or not, etc. In some embodiments, the processor may determine specific categories of objects in block 430, such as recognizing and classifying objects as adults, children, dogs, cats, trees, etc. In some embodiments, the processor may determine specific identities of objects in block 430, such as recognizing particular individuals (e.g., using facial recognition) or particular animals (e.g., the family dog) for which the processor may be trained (e.g., through an initial training routine) and for which particular (e.g., user-assigned) unpredictability ratings may be specified. The more specific the classification made in block 430, the more different proximity thresholds and/or unpredictability ratings may be assigned to various objects by the processor.

As part of classifying objects in block 430, the processor may determine that some objects cannot be classified, in which case the determined classification may be unknown or a default classification. In some embodiments, the operations of classifying objects in block 430 may be performed for all detected objects in the vicinity of the robotic vehicle. In some embodiments only the closest or closest few objects may be classified in block 430.

As part of recognizing or classifying objects in block 430, the processor may associate such objects with entries within a database that characterizes objects or classes of objects with a parameter characterizing the unpredictability of the object. For example, objects classified as solid structures (e.g., buildings, trees, etc.) may be characterized with a low unpredictability parameter (or high predictability parameter) since such structures typically do not move in an unpredictable manner. As another example, animals may be characterized with a relatively high unpredictability parameter (or low predictability parameter) since animals move and may do so in an unpredictable manner. In some embodiments, the parameter of unpredictability may be binary, and thus either predictable (e.g., buildings and similar structures) or unpredictable (e.g., any object that is moving or can move). Objects that are not recognized or classified by the processor may be assigned a default unpredictability parameter.

In determination block 440, the processor may determine whether any of the objects in the vicinity of the robotic vehicle are classified as being unpredictable. For example, the processor may determine whether any object's unpredictability parameter exceeds a particular threshold.

In response to determining that at least one nearby object is classified as being unpredictable (i.e., determination block 440="Yes"), the processor may adjust the proximity threshold used by the collision avoidance system as appropriate for any objects classified as unpredictable. In some embodiments in which different objects may have different assigned levels of unpredictability, the processor may adjust the proximity threshold consistent with the most unpredictable object that has been recognize and classify. In some embodiments in which different objects may have different assigned levels of unpredictability, the processor may adjust the proximity threshold in a manner that gives greater weight to objects along the path of travel or approaching the robotic vehicle. For example, the processor may identify those objects presenting the greatest risk of collision, and adjust the proximity threshold consistent with those objects.

In response to determining that no nearby objects are classified as being unpredictable (i.e., determination block 440="No"), the processor may maintain the use of a default proximity threshold by the collision avoidance system in block 460. In situations in which the proximity threshold has been adjusted to be different than the default proximity threshold in block 450, the processor may return the proximity threshold to the default value in block 460.

The operations of the method 400 may be performed continuously as the robotic vehicle operates in the environment. Thus, the method 400 enables a robotic vehicle to operate with a collision avoidance system using a proximity threshold that adjusts for the degree to which detected objects may behave or move in an unpredictable manner. This capability may improve the operation of robotic vehicles by enabling maneuvering closer to fixed or immovable objects (e.g., walls) while giving wider berth to movable objects, such as animals, that may move quickly and in an unpredictable manner.

Figure 5:
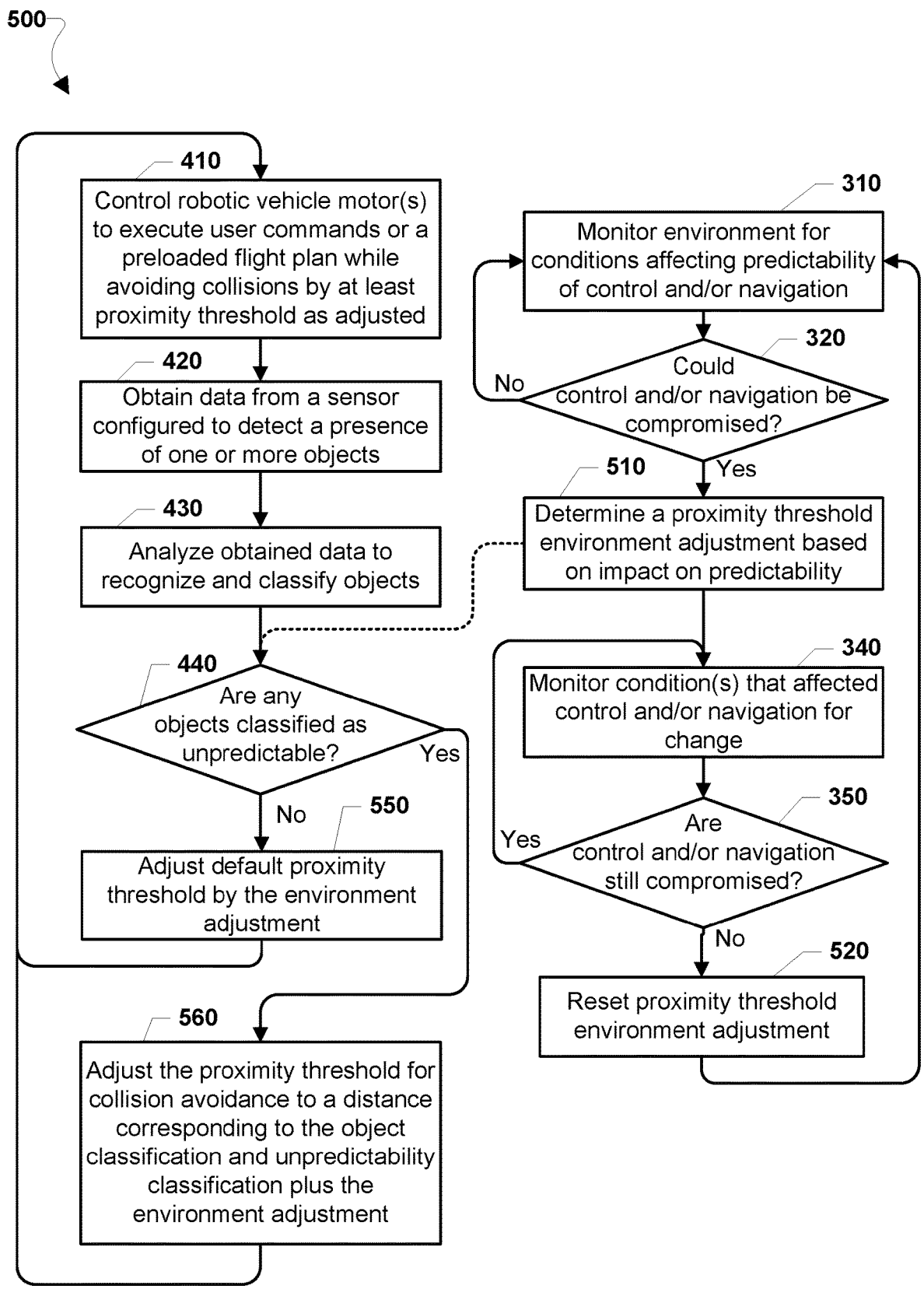
FIG. 5 is a process flow diagram illustrating a method for operating a robotic vehicle to avoid obstacles by at least a proximity threshold that compensates for unpredictability of the operating environment or conditions and a classification of an obstacle in accordance with various embodiments.

FIG. 5 illustrates a method 500 for operating a robotic vehicle in a manner that adjusts the collision avoidance system proximity threshold to account for unpredictability in both environmental and other conditions as well as unpredictability of nearby objects according to some embodiments. With reference to FIGS. 1A-5, the method 500 may be performed by a processor, such as a processor (220) within a processing device (e.g., 210) of a robotic vehicle (e.g., 200) to detect obstacles (e.g., 120) and perform an action in response.

In the method 500, some operations of the method 300 and the method 400 may be performed more or less in parallel. Thus, determinations of proximity threshold adjustments made by the robotic device processor to accommodate unpredictability in environmental and other conditions may be determined in parallel and used in conjunction with adjustments to the proximity threshold determined by the processor based upon recognition and/or classification of nearby objects. Thus, the method 500 may implement operations in blocks 310, 320, 340, and 350 of the method 300 and in blocks 410-440 of the method 400 as described.

In block 310, the processor may monitor the environment and state of the robotic vehicle for conditions that may potentially affect the predictability of vehicle control and/or navigation as described in the method 300. Also as part of the operations in block 310, the processor may monitor images from a camera or cameras used in navigation and obstacle detection to determine whether there are any conditions that may impact computer vision processing algorithms used for navigation and collision avoidance. In determination block 320, the processor may determine whether any such conditions exist that could compromise the control and/or navigation capabilities of the robotic vehicle as described in the method 300.

In response to determining that the control and/or navigation of the robotic vehicle may be compromised by environmental or other conditions (i.e., determination block 320="Yes"), the processor may determine a proximity threshold environment adjustment based upon the determined impact or potential impact on control/navigation predictability. Thus, instead of adjusting the proximity threshold as in method 300, the processor may determine an adjustment that should be added to other proximity threshold adjustments to account for unpredictability in or due to environmental or other conditions. This proximity threshold environmental adjustment may be stored in memory, such as in a buffer used by the collision avoidance system or vehicle control system. Thus, while environmental or other conditions exhibit unpredictability that could compromise the control or navigation of the robotic vehicle, a suitable adjustment to the proximity threshold may be maintained in memory for use by the processor in determining an appropriate proximity threshold for use by the collision avoidance system in block 560.

In block 340 and determination block 350, the processor may monitor the conditions determined to affect or potentially affect the control and/or navigation of the robotic vehicle to detect when such conditions change such that the control/navigation of the vehicle remains compromised as described in the method 300.

In response to determining that environmental or other conditions have changed such that the control and/or navigation of the robotic vehicle are no longer compromised (i.e., determination block 350="No"), the processor may reset the proximity threshold environment adjustment to a default value in block 520, such as setting the adjustment to 0. Thus, when there are no environmental or other conditions compromising the control or navigation of the robotic vehicle, the processor may determine an appropriate proximity threshold for use by the collision avoidance system based solely upon recognized or classified nearby objects (if any) in block 560.

In block 410, the robotic vehicle processor may provide control signals to control one or more motors of the robotic vehicle to execute user commands (e.g., a user controlled operation) or a preloaded flight plan while using the collision avoidance system to avoid colliding with objects and obstacles.

In block 420, the processor may obtain data from one or more sensors that are configured to detect the presence of one or more objects in the vicinity of the robotic vehicle as described in the method 400.

In block 430, the processor (or another processor configured to perform such analysis) may analyze the obtained sensor data to recognize and/or classify objects that are in the vicinity of the robotic vehicle as described.

In determination block 440, the processor may determine whether there are any objects present in the vicinity of the robotic vehicle that are classified as being unpredictable as described in the method 400.

In response to determining that no nearby obstacles are classified as being unpredictable (i.e., determination block 440="No"), the processor may adjust the default proximity threshold by the proximity threshold environment adjustment in block 550 such as by increasing the default proximity threshold by the proximity threshold environment adjustment determined in block 510. Thus, when no objects are nearby, the collision avoidance system may use a proximity threshold based upon the default value adjusted to account for unpredictability in the environment or other conditions.

In response to determining that one or more nearby obstacles are classified as being unpredictable (i.e., determination block 440="Yes"), the processor may adjust the proximity threshold used by the collision avoidance system to a distance corresponding to at least one of the object unpredictability classifications plus an adjustment to account for unpredictability in the environment or other conditions in block 560. Thus, the processor may set the proximity threshold by using a proximity threshold corresponding to or appropriate for one or more nearby objects based upon the unpredictability of such objects, and further adjust the proximity threshold to accommodate the degree to which control and/or navigation may be compromised by unpredictable conditions in the operating environment.

The operations of the method 500 may be performed continuously during operations so that the proximity threshold is adjusted to account for changing environmental and other conditions, and as the robotic vehicle detects and approaches various objects. Thus, the method 500 improves operations of robotic vehicles by enabling the collision avoidance system to dynamically adapt to changing conditions and encountered objects or obstacles.

Figure 6:
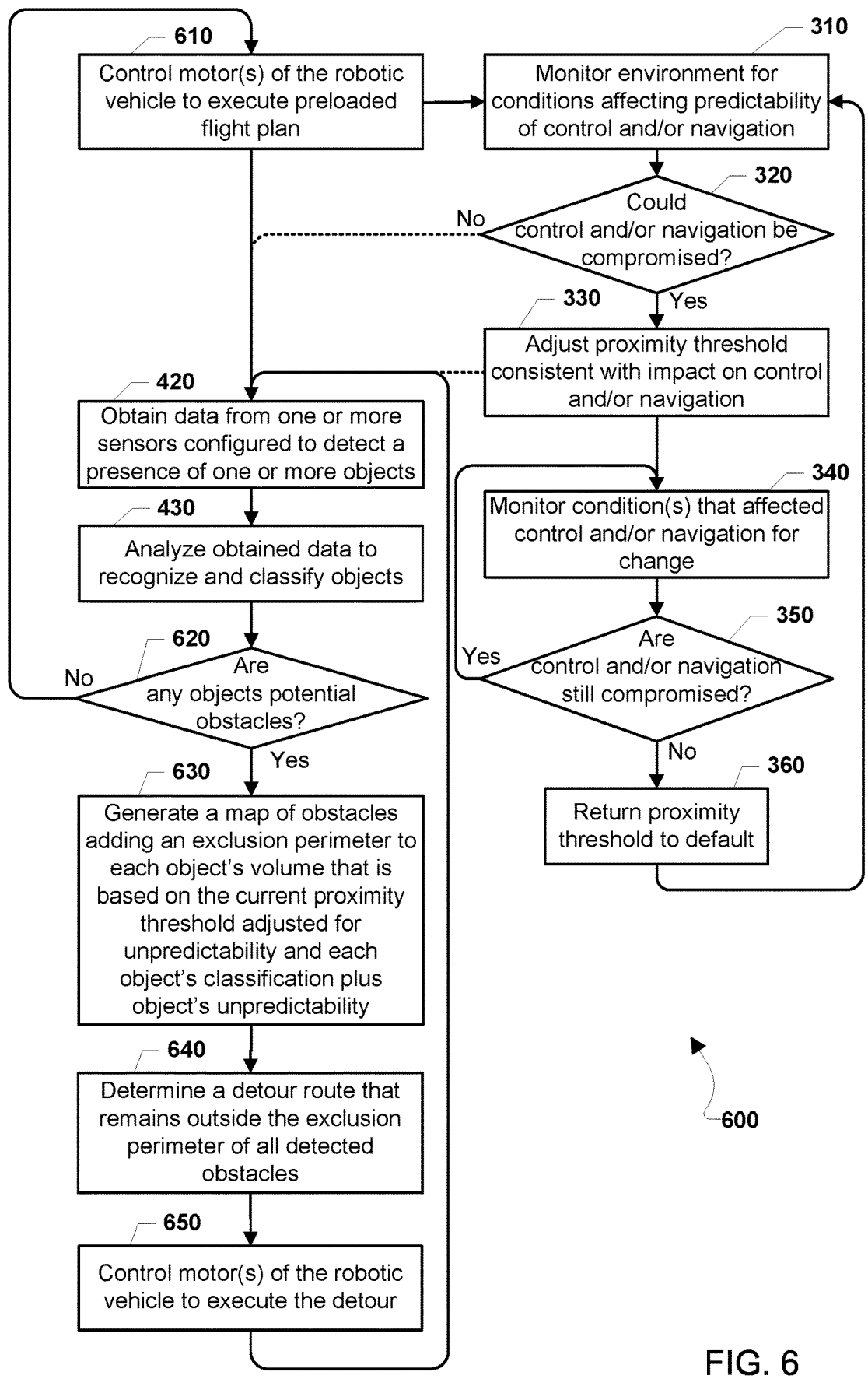
FIG. 6 is a process flow diagram illustrating method for operating a robotic vehicle including path planning to avoid each obstacle by at least an exclusion perimeter that compensates for unpredictability of the operating environment or conditions and a classification of the obstacle in accordance with various embodiments.

FIG. 6 illustrates a method 600 for operating a robotic vehicle that enables path planning while accounting for unpredictability of encountered objects and 4 impacts on maneuvering and/or navigation due to uncertainty in the environment and other conditions according to some embodiments. With reference to FIGS. 1A-6, the method 400 may be performed by a processor, such as a processor (220) within a processing device (e.g., 210) of a robotic vehicle (e.g., 200) to detect obstacles (e.g., 120) and perform an action in response.

In some embodiments, the processor of the robotic vehicle may use object classifications to adjust proximity thresholds for a variety of detected objects to account for their unpredictability and for unpredictability in environmental and other conditions while performing path planning around such objects. By adjusting the proximity threshold used by the collision avoidance system to account for unpredictability in environmental and other conditions using the method 300 and evaluating each of the appropriate proximity thresholds for each detected object within the vicinity of the robotic vehicle using some of the operations of the method 400, the processor may develop a detour or path plan alternative in the method 600 that enables the robotic vehicle to maneuver around the objects in a manner that avoids approaching any objects closer than its corresponding proximity threshold. By performing such path planning, the robotic vehicle may follow an efficient path around or through detected objects compared to using the collision avoidance system to avoid colliding with individual obstacles, which could result in the robotic vehicle having to backtrack or follow a random path through a plurality of obstacles. Various methods for accomplishing such path planning are possible. The method 600 illustrated in FIG. 6 provides an example of one method that may be implemented for this purpose.

In blocks 310-360, the processor may monitor environmental and other conditions and adjust the proximity threshold accordingly as described in the method 300.

In block 610, the processor of the robotic vehicle may be controlling one or more motors of the robotic vehicle to execute a preplanned of flight.

In block 420, the processor may obtain data from one or more sensors that are configured to detect the presence of objects in the vicinity of the vehicle. As described, such sensors may include one or more cameras, radar, sonar, lidar, etc. Data from such sensors may be stored in memory, such as buffer memory, to enable analysis by the processor.

In block 430, the processor may analyze the obtained sensor data to recognize and classify the objects in the vicinity of the vehicle. Such analyses may implement one or more of the operations of the like numbered block of the method 400 as described.

In determination block 620, the processor may determine whether any of the identified and classified objects present obstacles or potential obstacles to the robotic vehicle. In particular, the processor may determine whether any of the objects identified in block 430 are close to the preplanned flight path.

In response to determining that no obstacles or potential obstacles are present in the vicinity of the robotic vehicle (i.e., determination block 620="No"), the processor may continue to control one or more motors of the robotic vehicle to execute the preplanned flight path in block 610.

In response to determining that one or more classified objects do or could present obstacles to the robotic vehicle (i.e., determination block 620="Yes"), the processor may generate a virtual map of the objects in block 630 that adds in an exclusion perimeter around each object's volume that is based upon the current (i.e., adjusted or default) proximity threshold accounting for environmental or other conditions and that object's classification and uncertainty as determined in block 430. Thus, instead of adjusting the proximity threshold used in the collision avoidance system for individual objects, the processor may use the adjusted proximity threshold plus a radial distance appropriate for the object's classification and unpredictability to extend the boundary of an object as represented in the virtual map generated in block 630. A distance may be used for adding an exclusion perimeter around objects (i.e., no extension beyond the adjusted priority threshold) for which a classification is not determined.

In block 640, the processor may use the map generated in block 630 to determine a detour route around or through the identified obstacles that ensures the robotic vehicle remains outside of the respective proximity threshold for all obstacles under the current environmental and other conditions. The processor may accomplish such path planning using any of a variety of path planning algorithms. Using the proximity threshold adjusted for current environmental and other conditions plus object classification-specific additional margins to add exclusion perimeters around objects in block 630 facilitates planning a path that maneuvers around objects that takes into account unpredictability due to object movements and conditions that compromise or may compromise maneuvering and navigational control.

In block 650, the processor may control one or more motors of the robotic vehicle to execute the detour. Doing so, the processor may continue to obtain data from various sensors in block 420 and analyze the sensor data to recognizing classify nearby objects in block 430 as described. Once the robotic vehicle has cleared the obstacles, such as by completing the detour (i.e., determination block 620="No"), the processor may return to controlling the one or more motors of the robotic vehicle to execute the preplanned flight path in block 610, and repeat the operations of the method 600 as described. Also, the operations in blocks 310-360 may be performed continuously to enable the proximity threshold to be adjusted dynamically to account for changes in environmental and other conditions.

Figure 7:
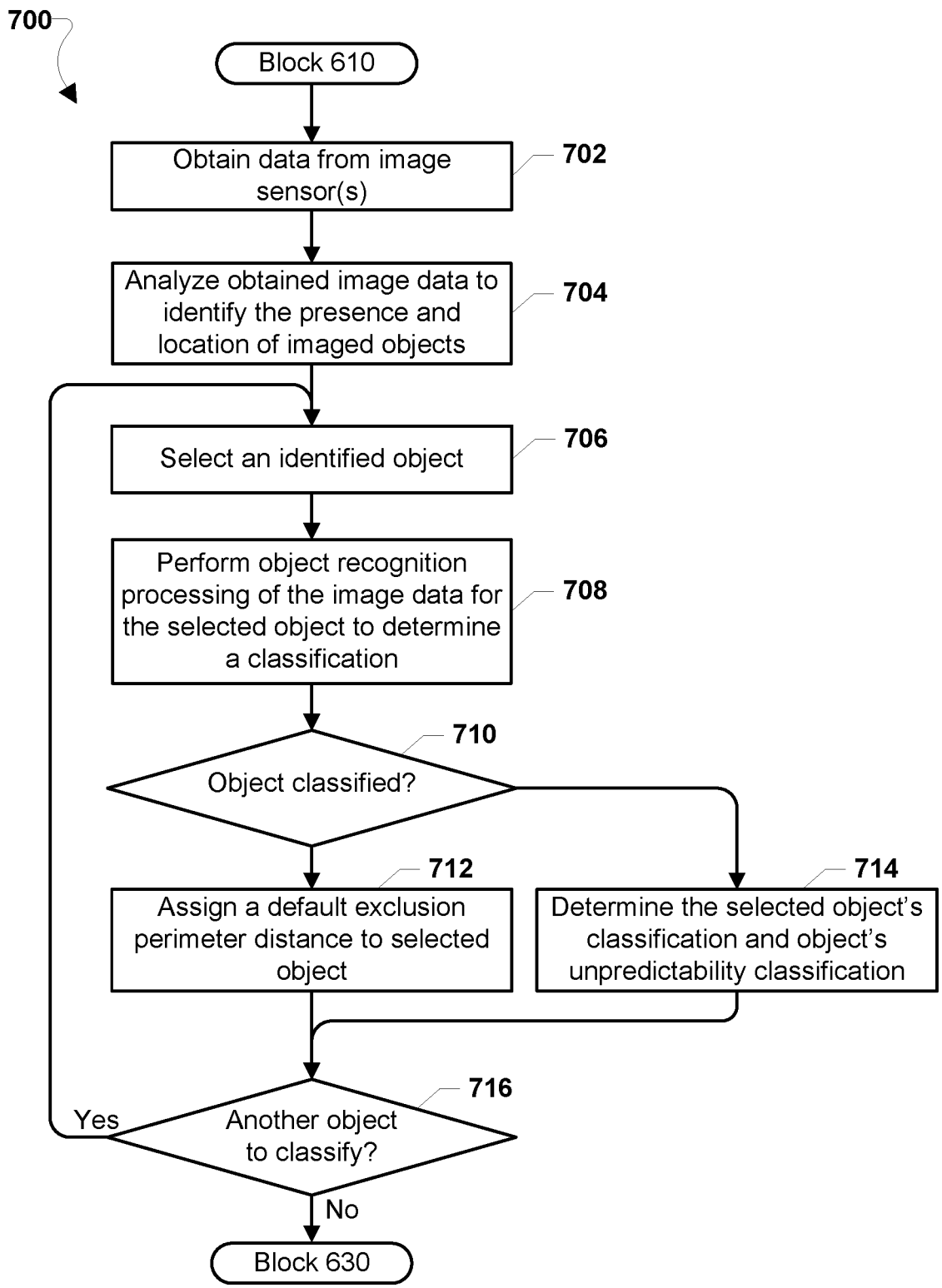
FIG. 7 is a process flow diagram illustrating a method of classifying objects and assigning exclusion perimeter distances to the objects based upon each object's classification and/or unpredictability in accordance with various embodiments.

FIG. 7 illustrates a method 700 for detecting and classifying objects for use in the method 600 according to some embodiments. With reference to FIGS. 1A-7, the method 700 may be performed by a processor, such as a processor (220) within a processing device (e.g., 210) of a robotic vehicle (e.g., 200) to detect obstacles (e.g., 120) and perform an action in response.

In block 702, the processor may obtain data from image sensors, such as one or more cameras positioned on the robotic vehicle. The processor may also obtain other sensor data, such as radar or lidar data, that is useful for determining the relative location of objects. Such data may be stored in local memory for processing, such as buffer memory.

In block 704, the processor may analyze the obtained image and other data to identify the presence and location of the imaged objects. Such image analysis may involve identifying edges zones of different colors and other types of processes that are typically used to identify objects within images. In some embodiments, the robotic vehicle may be equipped with stereoscopic cameras which may enable the processor to determine the distance to various objects using stereoscopy. In embodiments in which the robotic vehicle is equipped with only a monocular camera, distances to various objects may be determined based on the shift in position of objects from one frame to the next as the robotic vehicle moves to the environment. In embodiments in which the robotic vehicle is equipped with radar and/or lidar, the distances to objects may be determined using data from those sensors. In determining the location of objects, the processor may generate a file or database of object coordinates in memory that enables the processor to generate a map of objects in subsequent operations.

Each of the objects that are identified in block 704 may be individually analyzed using image recognition processes. To do so, the processor may implement a loop to individually investigate each object. Thus, in block 706, the processor may select one of the identified objects, and perform object recognition processing on of the image data for the selected object to determine the classification in block 708. As described, such image recognition processing may involve comparing image data to the database of classified objects to determine whether there is a close match. Such image recognition processes may involve the use of machine learning techniques.

In determination block 710, the processor may determine whether a classification is assigned to the selected object.

In response to determining that no classification is assigned to the selected object (i.e., determination block 710="No"), the processor may assign a default exclusion perimeter distance to the selected object in block 712.

In response to determining that a classification is assigned to the selected object (i.e., determination block 710="Yes"), the processor may assign to the selected object in exclusion perimeter distance corresponding to the classification of the selected object in block 714.

In determination block 716, the processor may determine whether there is another object within the image data to be classified. If so (i.e., determination block 716="Yes"), the processor may select another identified object in block 706 and repeat the operations of blocks 708-714 as described. When all objects have been classified (i.e., determination block 716="No"), the processor may proceed to generate a map of objects adding the exclusion perimeter based on each objects classification in block 630 of the method 600 as described.

Figure 8:
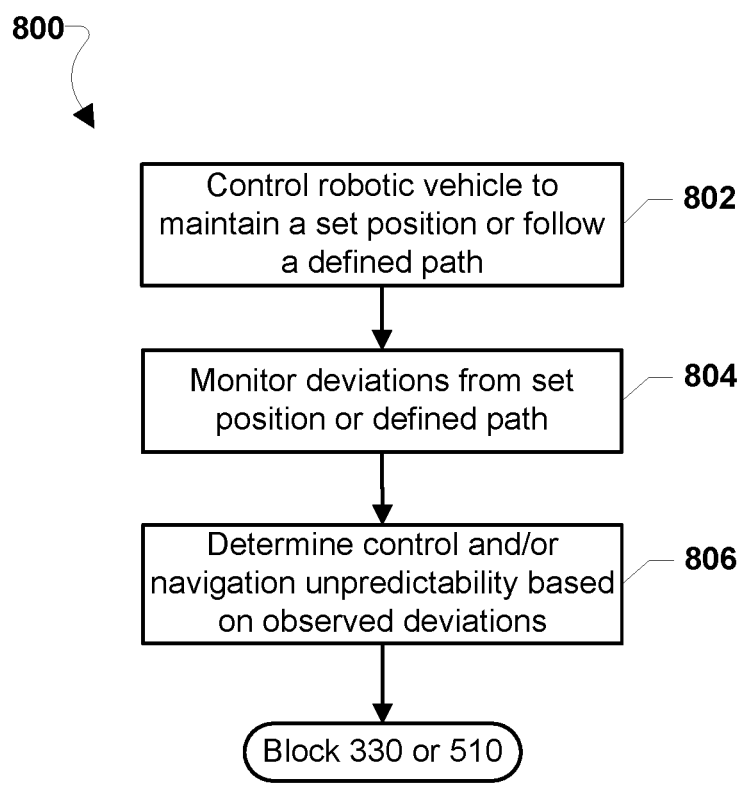
FIG. 8 is a process flow diagram illustrating a method of determining an unpredictability of the operating environment or conditions in accordance with various embodiments.

FIG. 8 illustrates an example method 800 for determining control and/or navigational unpredictability and magnitude by monitoring control and attitude of the robotic vehicle according to some embodiments. With reference to FIGS. 1A-8, the method 800 may be performed by a processor, such as a processor (220) within a processing device (e.g., 210) of a robotic vehicle (e.g., 200) to detect obstacles (e.g., 120) and perform an action in response.

In block 802, the processor may control the robotic vehicle to maintain a set position or follow a defined path so that the controllability of the robotic vehicle under the current conditions can be monitored. In some embodiments, this may involve attempting to hold the robotic vehicle (e.g., an aerial or waterborne vehicle) in a set position, such as a hover. For example, an aerial robotic vehicle may use camera data and GPS data in a flight control system in an attempt to hover in a fixed geographic location at a fixed altitude. For example, a waterborne robotic vehicle may use camera data and GPS data in a maneuvering control system in an attempt to remain at a fixed coordinate or to follow a defined path (e.g., a straight line) on the water. For example, a land-based robotic vehicle may use camera data and GPS data in a navigation system in an attempt to follow a defined path (e.g., a straight line) on a roadway. Maneuvering to remain in a fixed position or follow a defined path will require the control system to adjust for any forces acting on the robotic vehicle, such as from wind, waves, precipitation, ice, or snow (such as for land-based vehicles), thereby enabling measurements to be made of the forces acting on the robotic vehicle from environmental conditions.

In block 804, the processor may monitor for deviations from the set position or defined path caused by environmental conditions. In some embodiments, the processor may use camera data and GPS data to detect when the robotic vehicle deviates from the set position or defined path. Such deviations may occur when environmental forces acting on the robotic vehicle exceed the control capabilities of the vehicle control system. Momentary deviations may occur when unpredictable changes in environmental forces act on the robotic vehicle before the vehicle control system is able to respond and return to the set position or defined path. For example, a wind gust may blow an aerial robotic vehicle away from a hovering position momentarily until the vehicle control system can apply sufficient thrust to overcome the force of the wind and return to the hovering position. Such monitoring of deviations from the set position or defined path may be performed over a period of time to capture sufficient deviation events to characterize the unpredictable nature of the environment in terms of forces and periodicity.

In block 806, the processor may determine the control and/or navigational unpredictability effects of the environment based on the deviations observed in block 804. In some embodiments, this may involve determining a maximum deviation that was observed in block 804. In some embodiments, this may involve using statistical analysis of the deviations observed in block 804 to calculate a maximum probable deviation.

The results of the determination made in 806 may be used by the processor in block 330 of the methods 300 or 600 or in block 510 of the method 500 as described.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any example embodiment. For example, one or more of the operations of the methods 300, 400, 500, 600, 700 and/or 800 may be substituted for or combined with another.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with various embodiments may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method for operating a robotic vehicle, comprising:
monitoring, by a processor of the robotic vehicle, environmental conditions affecting predictability of control or navigation of the robotic vehicle;
determining, by the processor of the robotic vehicle, an amount of impact on the control or navigation of the robotic vehicle the monitored environmental conditions may have; and
in response to determining that control or navigation of the robotic vehicle is or could be compromised by the amount of impact, adjusting a proximity threshold used in a collision avoidance system to accommodate the determined amount of impact on the control or navigation of the robotic vehicle.

2. The method of claim 1, further comprising:
monitoring the environmental conditions affecting control or navigation of the robotic vehicle for change; and
returning the proximity threshold to a default value in response to determining that control or navigation of the robotic vehicle are no longer compromised by the environmental conditions.

3. The method of claim 1, wherein determining, by the processor of the robotic vehicle, an amount of impact on the control or navigation of the robotic vehicle the monitored environmental conditions may have comprises:
operating the robotic vehicle to remain in a set position or follow a defined path;
monitoring positions of the robotic vehicle to detect deviations from the set position or follow a defined path; and
determining an amount of impact on the control or navigation based on observed deviations from the set position or follow a defined path.

4. The method of claim 1, further comprising:
obtaining, by the processor, sensor data from one or more sensors configured to detect one or more objects in a vicinity of the robotic vehicle;
determining, by the processor based on the sensor data, whether one or more objects in the vicinity of the robotic vehicle pose an obstacle or potential obstacle to the robotic vehicle; and
in response to determining that one or more objects in the vicinity of the robotic vehicle pose an obstacle or potential obstacle to the robotic vehicle:
determining, by the processor, a classification of an object posing an obstacle or potential obstacle to the robotic vehicle;
further adjusting, by the processor, the proximity threshold based on the classification of the object posing an obstacle or potential obstacle to the robotic vehicle; and
controlling, by the processor, the robotic vehicle using the further adjusted proximity threshold for collision avoidance.

5. The method of claim 4, wherein further adjusting the proximity threshold based on the classification of the object posing an obstacle or potential obstacle to the robotic vehicle comprises increasing the proximity threshold adjusted for environmental conditions affecting control or navigation of the robotic vehicle by an amount corresponding to the classification of the object and unpredictability of the object.

6. The method of claim 4, wherein:
determining a classification of the object posing an obstacle or potential obstacle to the robotic vehicle comprises determining whether the object is animate object or inanimate object; and
further adjusting the proximity threshold based on the classification of the object comprises one of increasing the adjusted proximity threshold in response to the classification of the object being animate or decreasing the proximity threshold in response to the classification of the object being inanimate.

7. The method of claim 4, wherein adjusting the proximity threshold setting in the collision avoidance system based on the classification of the object comprises determining a degree of movement unpredictability of the object corresponding to the determined classification of the object.

8. The method of claim 7, wherein determining the degree of movement unpredictability of the object corresponding to the determined classification of the object comprises accessing a data structure in memory for the degree of movement unpredictability correlated to the classification of the object.

9. The method of claim 4, further comprising returning the proximity threshold setting in the collision avoidance system to the proximity threshold adjusted consistent with the effect on the control or navigation of the robotic vehicle of the environmental conditions in response to determining that there are no objects in the vicinity of the robotic vehicle posing an obstacle or potential obstacle to the robotic vehicle.

10. The method of claim 4, wherein determining a classification of an object posing an obstacle or potential obstacle to the robotic vehicle comprises determining a classification for all objects posing an obstacle or potential obstacle to the robotic vehicle, the method further comprising:
generating a map of all objects posing an obstacle or potential obstacle to the robotic vehicle in which the proximity threshold adjusted consistent with the effect on the control or navigation of the robotic vehicle of the environmental conditions and a further distance corresponding to each object based on the object's classification are added as an exclusion perimeter around the object's volume;
determining a detour that remains outside the exclusion perimeter of all detected obstacles; and
controlling the robotic vehicle to execute the detour.

11. A robotic vehicle, comprising:
one or more sensors configured to detect an object in a vicinity of the robotic vehicle; and
a processor coupled to the one or more sensors and configured with processor-executable instructions to:
monitor environmental conditions affecting predictability of control or navigation of the robotic vehicle;
determine an amount of impact on the control or navigation of the robotic vehicle the monitored environmental conditions may have; and
adjust a proximity threshold used in a collision avoidance system to accommodate the determined amount of impact on the control or navigation of the robotic vehicle in response to determining that control or navigation of the robotic vehicle is or could be compromised by the amount of impact.

12. The robotic vehicle of claim 11, wherein the processor is further configured to:
monitor the environmental conditions affecting control or navigation of the robotic vehicle for change; and
return the proximity threshold to a default value in response to determining that control or navigation of the robotic vehicle are no longer compromised by the environmental conditions.

13. The robotic vehicle of claim 11, wherein the processor is further configured to determine an amount of impact on the control or navigation of the robotic vehicle the monitored environmental conditions may have by:
operating the robotic vehicle to remain in a set position or follow a defined path;
monitoring positions of the robotic vehicle to detect deviations from the set position or follow a defined path; and
determining an amount of impact on the control or navigation based on observed deviations from the set position or follow a defined path.

14. The robotic vehicle of claim 11, wherein the processor is further configured to:
obtain sensor data from the one or more sensors;
determine, based on the sensor data, whether one or more objects in the vicinity of the robotic vehicle pose an obstacle or potential obstacle to the robotic vehicle; and
in response to determining that one or more objects in the vicinity of the robotic vehicle pose an obstacle or potential obstacle to the robotic vehicle:
determine a classification of an object posing an obstacle or potential obstacle to the robotic vehicle;
further adjust the proximity threshold based on the classification of the object posing an obstacle or potential obstacle to the robotic vehicle; and
control the robotic vehicle using the further adjusted proximity threshold for collision avoidance.

15. The robotic vehicle of claim 14, wherein the processor is further configured to further adjust the proximity threshold based on the classification of the object posing an obstacle or potential obstacle to the robotic vehicle by increasing the proximity threshold adjusted for environmental conditions affecting control or navigation of the robotic vehicle by an amount corresponding to the classification of the object and unpredictability of the object.

16. The robotic vehicle of claim 14, wherein the processor is further configured to:
determine a classification of the object posing an obstacle or potential obstacle to the robotic vehicle by determining whether the object is animate object or inanimate object; and
further adjust the proximity threshold based on the classification of the object by either increasing the adjusted proximity threshold in response to the classification of the object being animate or decreasing the proximity threshold in response to the classification of the object being inanimate.

17. The robotic vehicle of claim 14, wherein the processor is further configured to adjust the proximity threshold setting in the collision avoidance system based on the classification of the object by determining a degree of movement unpredictability of the object corresponding to the determined classification of the object.

18. The robotic vehicle of claim 17, wherein the processor is further configured to determine the degree of movement unpredictability of the object corresponding to the determined classification of the object by accessing a data structure in memory for the degree of movement unpredictability correlated to the classification of the object.

19. The robotic vehicle of claim 14, wherein the processor is further configured to return the proximity threshold setting in the collision avoidance system to the proximity threshold adjusted consistent with the effect on the control or navigation of the robotic vehicle of the environmental conditions in response to determining that there are no objects in the vicinity of the robotic vehicle posing an obstacle or potential obstacle to the robotic vehicle.

20. The robotic vehicle of claim 14, wherein the processor is further configured to:
determine a classification for all objects posing an obstacle or potential obstacle to the robotic vehicle;
generate a map of all objects posing an obstacle or potential obstacle to the robotic vehicle in which the proximity threshold adjusted consistent with the effect on the control or navigation of the robotic vehicle of the environmental conditions and a further distance corresponding to each object based on the object's classification are added as an exclusion perimeter around the object's volume;
determine a detour that remains outside the exclusion perimeter of all detected obstacles; and
control the robotic vehicle to execute the detour.

21. A processing device for use in a robotic vehicle having one or more sensors configured to detect an object in a vicinity of the robotic vehicle, the processing device configured to:
monitor environmental conditions affecting predictability of control or navigation of the robotic vehicle;
determine an amount of impact on the control or navigation of the robotic vehicle the monitored environmental conditions may have; and adjust a proximity threshold used in a collision avoidance system to accommodate the determined amount of impact on the control or navigation of the robotic vehicle in response to determining that control or navigation of the robotic vehicle is or could be compromised by the amount of impact.

22. The processing device of claim 21, wherein the processing device is further configured to:
monitor the environmental conditions affecting control or navigation of the robotic vehicle for change; and
return the proximity threshold to a default value in response to determining that control or navigation of the robotic vehicle are no longer compromised by the environmental conditions.

23. The processing device of claim 21, wherein the processing device is further configured to determine an amount of impact on the control or navigation of the robotic vehicle the monitored environmental conditions may have by:
operating the robotic vehicle to remain in a set position or follow a defined path;
monitoring positions of the robotic vehicle to detect deviations from the set position or follow a defined path; and
determining an amount of impact on the control or navigation based on observed deviations from the set position or follow a defined path.

24. The processing device of claim 21, wherein the processing device is further configured to:
obtain sensor data from the one or more sensors;
determine, based on the sensor data, whether one or more objects in the vicinity of the robotic vehicle pose an obstacle or potential obstacle to the robotic vehicle; and
in response to determining that one or more objects in the vicinity of the robotic vehicle pose an obstacle or potential obstacle to the robotic vehicle:
determine a classification of an object posing an obstacle or potential obstacle to the robotic vehicle;
further adjust the proximity threshold based on the classification of the object posing an obstacle or potential obstacle to the robotic vehicle; and
control the robotic vehicle using the further adjusted proximity threshold for collision avoidance.

25. The processing device of claim 24, wherein the processing device is further configured to further adjust the proximity threshold based on the classification of the object posing an obstacle or potential obstacle to the robotic vehicle by increasing the proximity threshold adjusted for environmental conditions affecting control or navigation of the robotic vehicle by an amount corresponding to the classification of the object and unpredictability of the object.

26. The processing device of claim 24, wherein the processing device is further configured to:
determine a classification of the object posing an obstacle or potential obstacle to the robotic vehicle by determining whether the object is animate object or inanimate object; and
further adjust the proximity threshold based on the classification of the object by either increasing the adjusted proximity threshold in response to the classification of the object being animate or decreasing the proximity threshold in response to the classification of the object being inanimate.

27. The processing device of claim 24, wherein the processing device is further configured to adjust the proximity threshold setting in the collision avoidance system based on the classification of the object by determining a degree of movement unpredictability of the object corresponding to the determined classification of the object.

28. The processing device of claim 24, wherein the processing device is further configured to return the proximity threshold setting in the collision avoidance system to the proximity threshold adjusted consistent with the effect on the control or navigation of the processing device of the environmental conditions in response to determining that there are no objects in the vicinity of the robotic vehicle posing an obstacle or potential obstacle to the robotic vehicle.

29. The processing device of claim 24, wherein the processing device is further configured to:
determine a classification for all objects posing an obstacle or potential obstacle to the robotic vehicle;
generate a map of all objects posing an obstacle or potential obstacle to the robotic vehicle in which the proximity threshold adjusted consistent with the effect on the control or navigation of the processing device of the environmental or other conditions and a further distance corresponding to each object based on the object's classification are added as an exclusion perimeter around the object's volume;
determine a detour that remains outside the exclusion perimeter of all detected obstacles; and
control the robotic vehicle to execute the detour.

\* \* \* \* \*